US006869474B2

(12) United States Patent
Perez-Pena et al.

(10) Patent No.: US 6,869,474 B2
(45) Date of Patent: Mar. 22, 2005

(54) VERY FAST SETTING CEMENTITIOUS COMPOSITION

(75) Inventors: Marianela Perez-Pena, Grayslake, IL (US); Ashish Dubey, Grayslake, IL (US)

(73) Assignee: United States Gypsum Company, Chicago, IL (US)

(*) Notice: Subject to any disclaimer, the term of this patent is extended or adjusted under 35 U.S.C. 154(b) by 0 days.

(21) Appl. No.: 10/414,686

(22) Filed: Apr. 16, 2003

(65) Prior Publication Data

US 2004/0040474 A1 Mar. 4, 2004

Related U.S. Application Data

(60) Provisional application No. 60/407,203, filed on Aug. 29, 2002.

(51) Int. Cl.[7] .............................................. C04B 24/12
(52) U.S. Cl. ........................ 106/727; 106/819; 106/823
(58) Field of Search ............................... 106/727, 819, 106/724, 823

(56) References Cited

U.S. PATENT DOCUMENTS

| | | | | |
|---|---|---|---|---|
| 2,437,842 A | * | 3/1948 | Uhler | |
| 3,553,077 A | | 1/1971 | Quint | .......................... 162/154 |
| 4,116,706 A | * | 9/1978 | Previte | |
| 4,257,814 A | * | 3/1981 | Kellet et al. | |
| 4,310,358 A | | 1/1982 | Azuma et al. | ................. 106/97 |
| 4,318,744 A | * | 3/1982 | Dodson | |
| 4,337,094 A | * | 6/1982 | Tokar | |
| 4,350,533 A | | 9/1982 | Galer et al. | .................... 106/89 |
| 4,373,956 A | * | 2/1983 | Rosskopf | |
| 4,473,405 A | * | 9/1984 | Gerber | |
| 4,488,909 A | | 12/1984 | Galer et al. | .................... 106/89 |
| 4,741,782 A | | 5/1988 | Styron | ......................... 106/309 |
| 4,770,708 A | * | 9/1988 | Atkins et al. | |
| 5,017,234 A | * | 5/1991 | Gartner et al. | ............... 106/781 |
| 5,112,405 A | * | 5/1992 | Sanchez | |
| 5,306,344 A | * | 4/1994 | Gutmann et al. | ............. 106/714 |
| 5,348,583 A | * | 9/1994 | Arfaei et al. | ................ 106/696 |
| RE35,194 E | * | 4/1996 | Gerber | ......................... 106/696 |
| 5,641,352 A | * | 6/1997 | Jeknavorian et al. | ........ 106/808 |
| 5,968,256 A | * | 10/1999 | Leikauf | ....................... 106/727 |
| 5,997,630 A | * | 12/1999 | Angelskar et al. | ........... 106/696 |
| 6,358,311 B1 | * | 3/2002 | Arai et al. | ................... 106/808 |

OTHER PUBLICATIONS

*Concrete Technology & Practice* Taylor (1965) p181–184, 1965.*

* cited by examiner

*Primary Examiner*—Paul Marcantoni
(74) *Attorney, Agent, or Firm*—John M. Lorenzen; David F. Janci; Jenkens & Gilchrist

(57) ABSTRACT

Extremely fast setting of cementitious compositions for producing cement-based products such as cement boards is made possible by adding an alkanolamine to a hydraulic cement such as portland cement, and forming a slurry with water under conditions that provide an initial slurry temperature of at least 90° F. Use of alkanolamine under conditions disclosed herein allows an extremely rapid setting of the cementitious composition. Additional reactive materials may be included such as high alumina cement, calcium sulfate and a pozzolanic material such as fly ash. The extremely fast rapid set permits rapid production of cementitious products.

42 Claims, 13 Drawing Sheets

VERY FAST SETTING CEMENTITIOUS COMPOSITION

Figure 1:
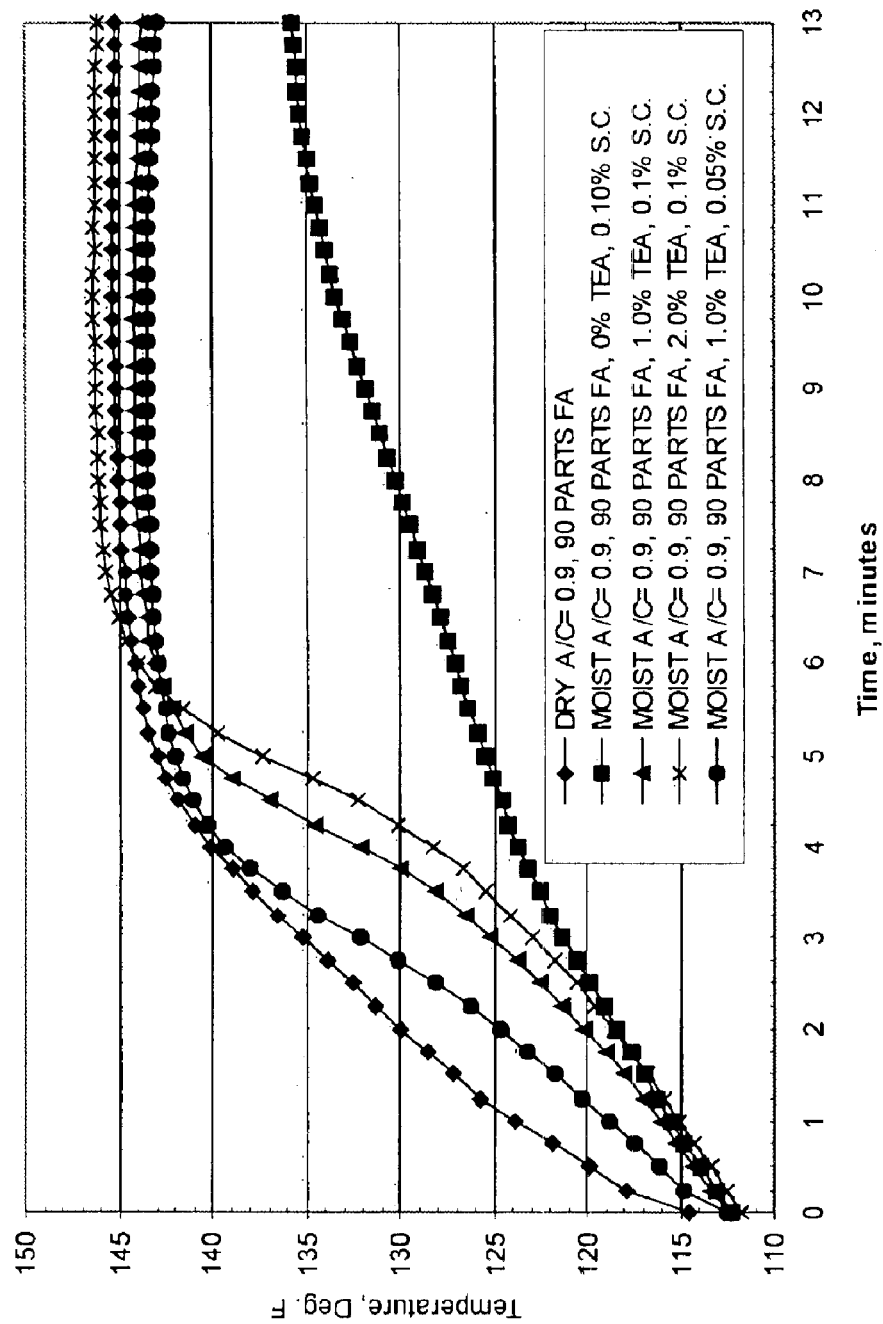

This application claims priority of provisional application 60/407,203 filed Aug. 29, 2002.

BACKGROUND OF THE INVENTION

This invention relates generally to very fast setting cementitious compositions that can be used for a variety of applications in which rapid hardening and attainment of early strength is desirable. In particular, the invention relates to those cementitious compositions that can be used to make boards with excellent moisture durability for use in wet and dry locations in buildings. Precast concrete products such as cement boards are made under conditions which provide a rapid setting of the cementitious mixture so that the boards can be handled soon after the cementitious mixture is poured into a stationary or moving form or over a continuously moving belt. Ideally, this will be occur as soon as 10 minutes, but more practically, setting of the cement mixture may be achieved up to about 20 minutes after being mixed with a suitable amount of water.

In U.S. Pat. No. 4,488,909, Galer et al discuss cementitious compositions capable of such rapid setting. Their compositions permit high speed production of carbon dioxide resistant cement boards by forming essentially all of the potential ettringite within about 20 minutes after the composition is mixed with water. The essential components of their cementitious composition are portland cement, high alumina cement, calcium sulfate and lime. Pozzolans such as fly ash, montmorillonite clay, diatomaceous earth and pumicite may be added up to about 25%. The cement composition includes about 14 to 21 wt % high alumina cement, which in combination with the other components makes possible the early formation of ettringite and other calcium aluminate hydrates, which are responsible for the early setting of the cementitious mixture.

In general, Galer's rapid setting formulation suffers from several major limitations. These limitations, as highlighted below, are even more of a concern for the production of cementitious products such as cement boards:

The final setting times of the cementitious mixtures are typically greater than 9 minutes. The final setting time is defined further in the examples below, but more generally, the cementitious mixtures have set to the extent that the cement-based products made thereof can be handled and stacked, although chemical reactions may continue for extended periods.

The amount of high alumina cement in the reactive powder blend is very high. Typically, the high alumina cement is greater than 14 wt % of the reactive powder blend.

The amount of pozzolanic materials is limited to 25 wt % of the reactive powder blend.

Lime is required as an additional ingredient to obtain rapid set. Presence of excess lime in cement boards is detrimental to their long-term durability performance. Cement boards often are reinforced with polymer coated glass fiber mesh that degrades, losing strength and ductility in a high alkaline environment. Presence of excess lime increases the alkalinity of the cementitious matrix and thereby negatively impacts the long-term durability performance of the polymer coated glass fiber mesh and the resulting cement boards. In addition, presence of excess lime also makes the concrete susceptible to sulfate attack thus influencing its durability.

Ettringite is a compound of calcium aluminum sulfate compound having the formula:

$$Ca_6Al_2(SO_4)_3 \cdot 32\, H_2O$$

or alternatively:

$$3\, CaO \cdot Al_2O_3 \cdot 3\, CaSO_4 \cdot 32\, H_2O$$

Ettringite forms as long needle-like crystals and provides rapid early strength to cement boards, so that they can be handled soon after being poured into a mold or over a continuous casting and forming belt. In the Galer et al compositions, alumina required for the formation of ettringite is supplied by high alumina cement (HAC) that typically contains 36–42 wt % $Al_2O_3$. Sulfate ions necessary for the formation of ettringite are provided by the gypsum present in Portland cement plus added gypsum, which is normally soluble in water. The lime needed for the formation of ettringite is provided by the portland cement and the added lime. The HAC is less soluble and is typically present in excess of that needed for ettringite formation. Thus, the gypsum and added lime are substantially consumed in the formation of ettringite. The availability and consumption of the HAC is usually increased by using a finely ground material. Since an excess of HAC is present in the cement board, it would be desirable to reduce its concentration as HAC is one of the more expensive components in the mixture.

High alumina cement has an advantage over portland cement since HAC develops its maximum strength much earlier. However, it does not retain that strength over time as secondary reactions occur. HAC does not set very rapidly by itself, but its contribution to the formation of ettringite and other calcium aluminate hydrates in the presence of other reactive powder blend components makes HAC valuable in production of cement boards. However, the amount of HAC used in the cement boards should be limited to what is necessary for forming ettringite in quantities sufficient to allow handling of the cement boards. Since HAC is more expensive than portland cement, the cost of making the cement boards can be reduced substantially if HAC is limited to smaller amounts, or more preferably even eliminated.

In the Galer et al composition, about 72 to 80 wt % is portland cement, about 14 to 21 wt % is HAC, about 3.5 to 10 wt % is calcium sulfate, and about 0.4 to 0.7 wt % is hydrated lime. Other materials, such as pozzolanic materials, e.g. fly ash, superplastizers, and other cement additives may be included.

Alkanolamines have been proposed for reducing the set time of cements, for example see U.S. Pat. Nos. 2,437,842; 3,553,077; 4,257,814 and 4,741,782. The effect of triethanolamine on the hydration of cement has been reported in technical papers, including Cement and Concrete Research, vol. 6, pp. 623–632, 1976, Pergamon Press, Inc. Such published information was more generally concerned with hydration of cement, rather than the preparation of cement boards and other precast concrete products, such as those of Galer et al., in which very rapid setting is needed. In their invention, Galer et al., provided the aluminates using high alumina cement (HAS) and sulfate ions using gypsum needed to form ettringite and achieve rapid setting of their cementitious mixture.

To achieve rapid set and final setting times of the order described in the Galer et al compositions, the current state-of-the-art inherently assumes that calcium aluminate cements such as HAC are required as a necessary and fundamental component in cementitious mixtures exhibiting rapid setting characteristics.

Thus, it was an objective of the present inventors to develop a cementitious composition that is capable of developing an extremely rapid set while simultaneously satisfying the following conditions:

The reactive powder blend of the cementitious composition should contain low concentrations of high alumina cement. Preferably, high alumina cement should be completely eliminated as a component of the reactive powder blend. Reducing alumina cement content helps to lower the cost of the product since high alumina cement is the most expensive component of a cementitious composition.

The reactive powder blend of the cementitious composition should contain very high concentrations of mineral additives, such as pozzolanic materials, up to 55 wt % of the reactive powder blend. Increasing the content of mineral additives, e.g. fly ash, would help to substantially lower the cost of the product. Moreover, use of pozzolanic materials in the composition would also help to enhance the long-term durability of the product as a consequence of the pozzolanic reactions.

The reactive powder blend of the cementitious composition should be free of externally added lime. Reduced lime content would help to lower the alkalinity of the cementitious matrix and thereby increase the long-term durability of the product.

The final setting time as measured according to the Gilmore needle (i.e., the time after which cement boards can be handled) of the cementitious composition preferably should be less than 60 minutes, more preferably less than 20 minutes and most preferably less than 10 minutes. A shorter setting time would help to increase the production output and lower the product manufacturing cost.

SUMMARY OF THE INVENTION

Extremely fast setting of cementitious compositions to form cementitious products, such as cement boards, is made possible by adding an alkanolamine, preferably about 0.03 to 4.0 wt %, more preferably about 0.05 to 2.0%, and most preferably about 0.05 to 1.0 wt % of an alkanolamine, preferably triethanolamine based on the weight of the reactive components, which will include at least a hydraulic cement, preferably portland cement, and also may include high alumina cement, calcium sulfate, and a mineral additive, preferably fly ash, to form a slurry with water under conditions that provide an initial slurry temperature above ambient, preferably at least 90° F. (32.2° C.) up to about 130° F. (54.4° C.) preferably at least 100° F. (37.8° C.), most preferably about 110–120° F. (43.3°–48.9° C).

In one embodiment, high alumina cement and calcium sulfate are omitted from the reactive powder blend of the invention. Optionally, other alkanolamines, such as monoethanolamine and diethanolamine, may be substituted for triethanolamine, or used in combination with triethanolamine.

Mineral additives possessing substantial, little, or no cementing properties may be included in the rapid setting composite of the invention. Mineral additives possessing pozzolanic properties, such as fly ash, are particularly preferred in the reactive powder blend of the invention. Aggregates and fillers may be added depending on the application of the rapid setting cementitious composition of the invention.

Other additives including sand, aggregate, lightweight fillers, water reducing agents such as superplasticizers, accelerating agents, retarding agents, air-entraining agents, foaming agents, shrinkage control agents, slurry viscosity modifying agents (thickeners), coloring agents and internal curing agents, may be included as desired depending upon the processability and application of the cementitious composition of the invention. One preferred composition excludes high alumina cement and calcium sulfate and includes as reactive powder components only portland cement and optionally a mineral additive, preferably fly ash and an alkanolamine, plus additives.

Rapid set is achieved by preparing the slurry at above ambient temperatures, preferably greater than 90° F. (32.2° C.), more preferably at least 100° F. (37.8° C.), most preferably about 110–120° F. (43.3–48.9° C.). Using an alkanolamine such as triethanolamine to accelerate setting of the cementitious composition when the slurry is formed at these elevated temperatures makes possible increased rate of production of cementitious products such as cement boards or alternatively, permits reduction or complete elimination of the high alumina cement often used in such cementitious compositions.

BRIER DESCRIPTION OF THE DRAWINGS

Figure 2:
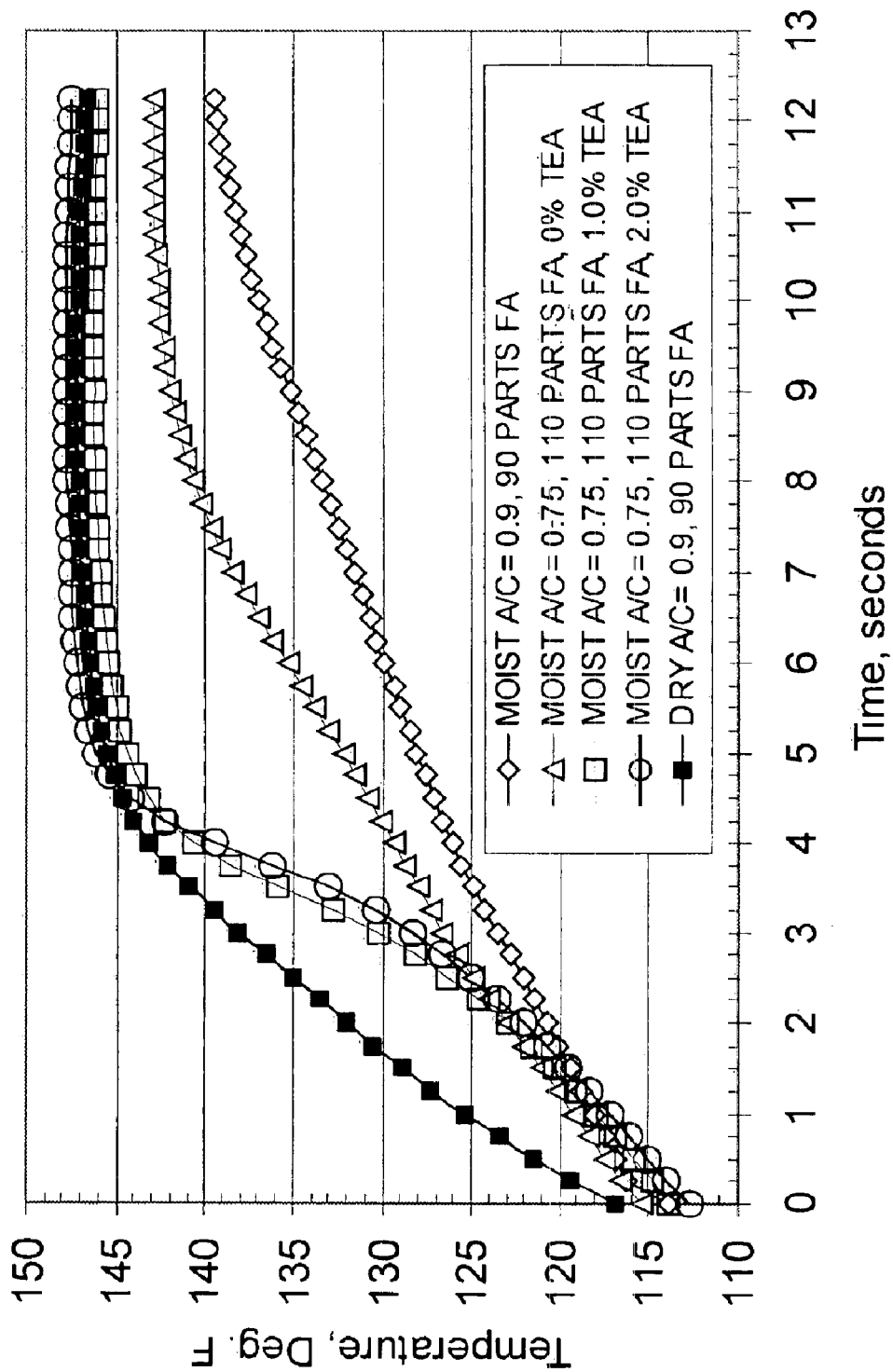
Figure 3:
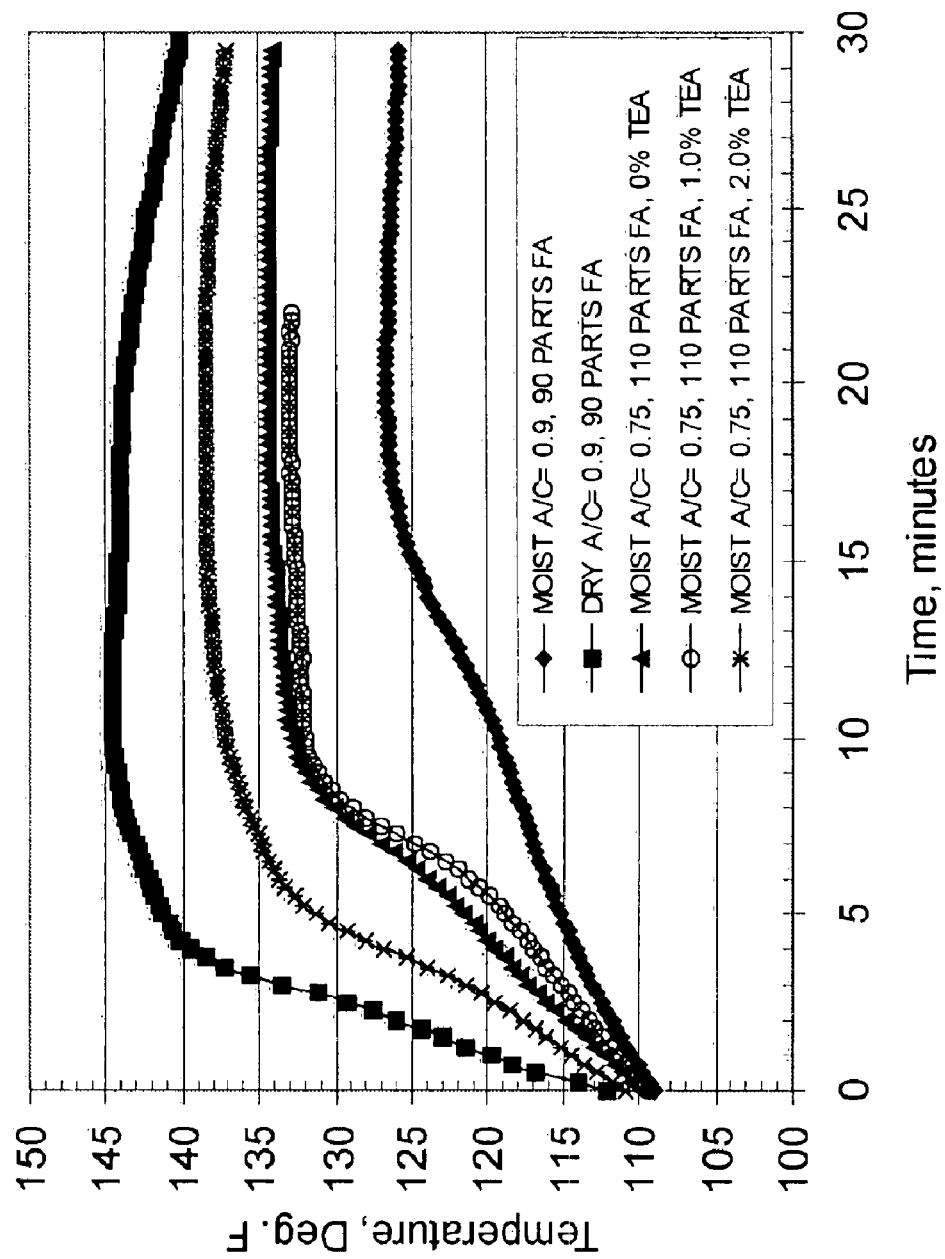
Figure 4:
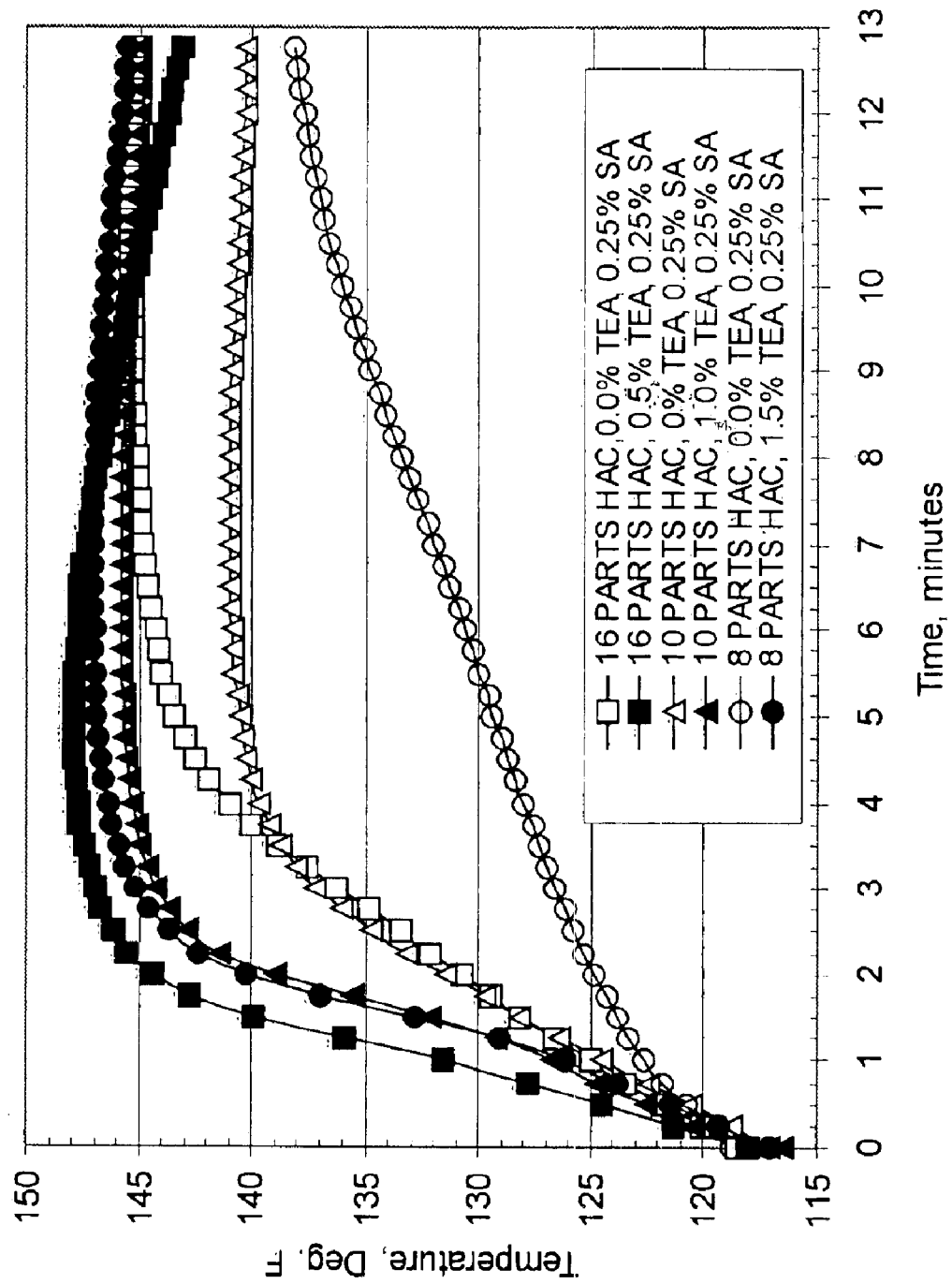
Figure 5:
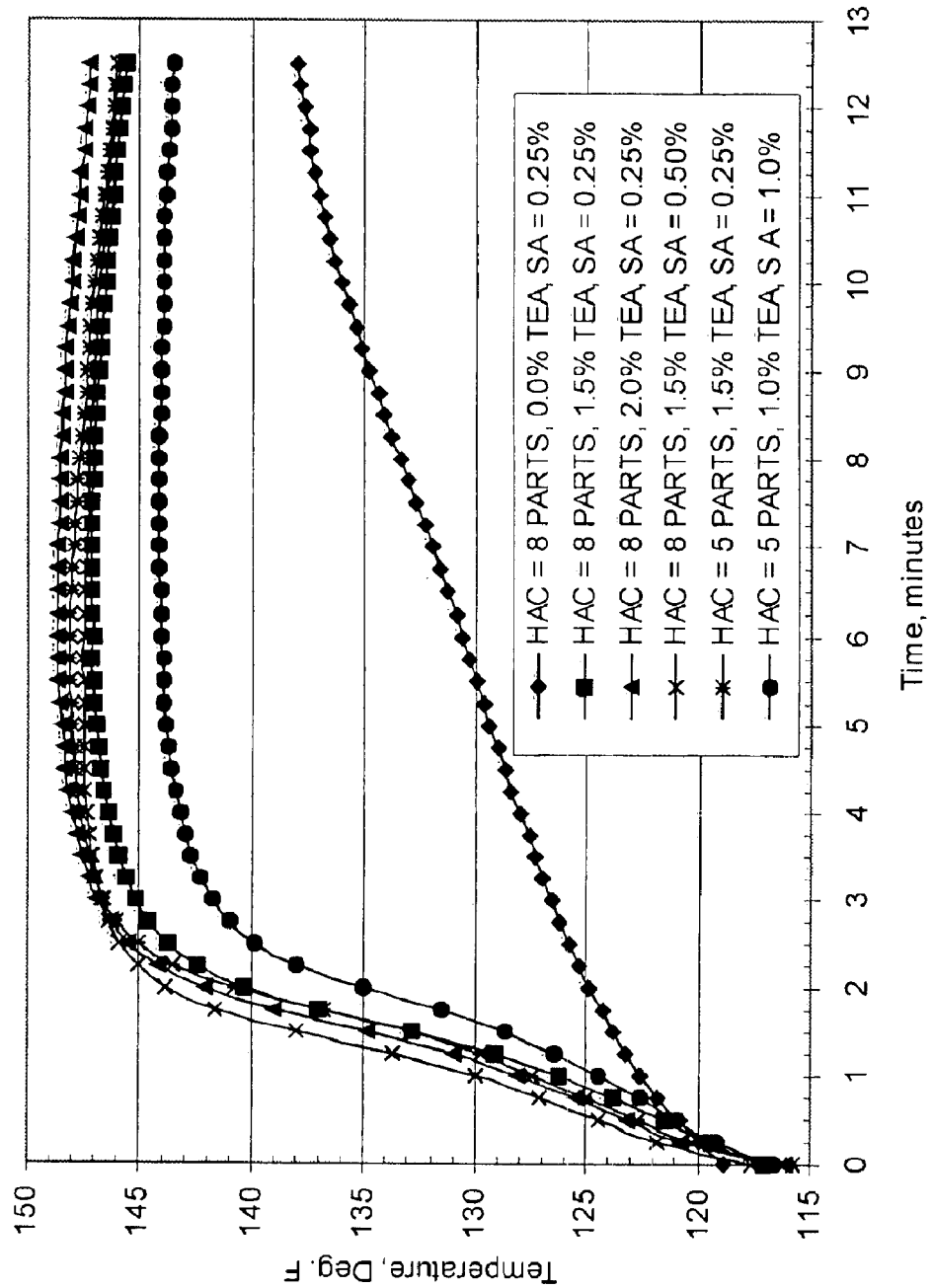
Figure 6:
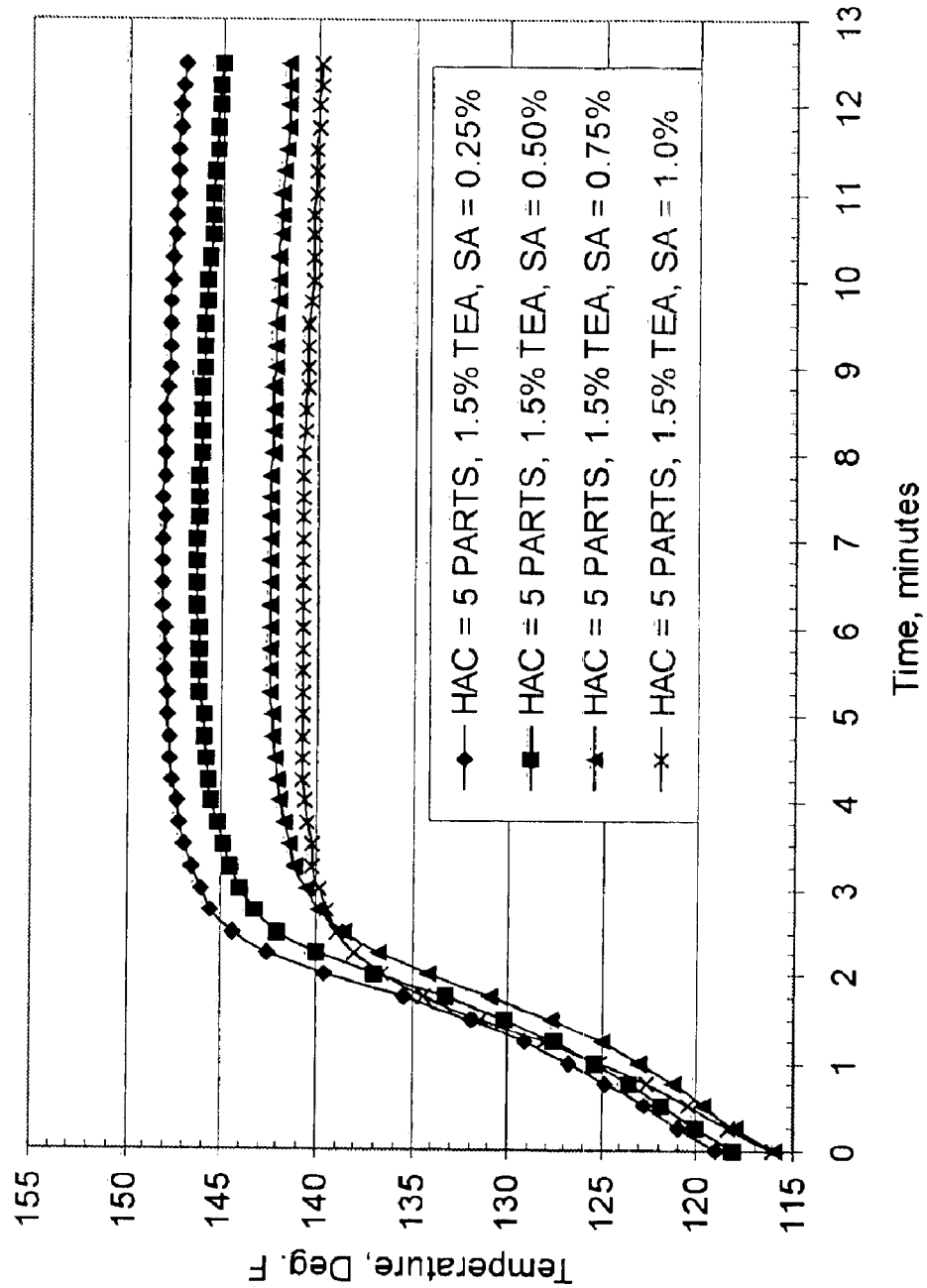
Figure 7:
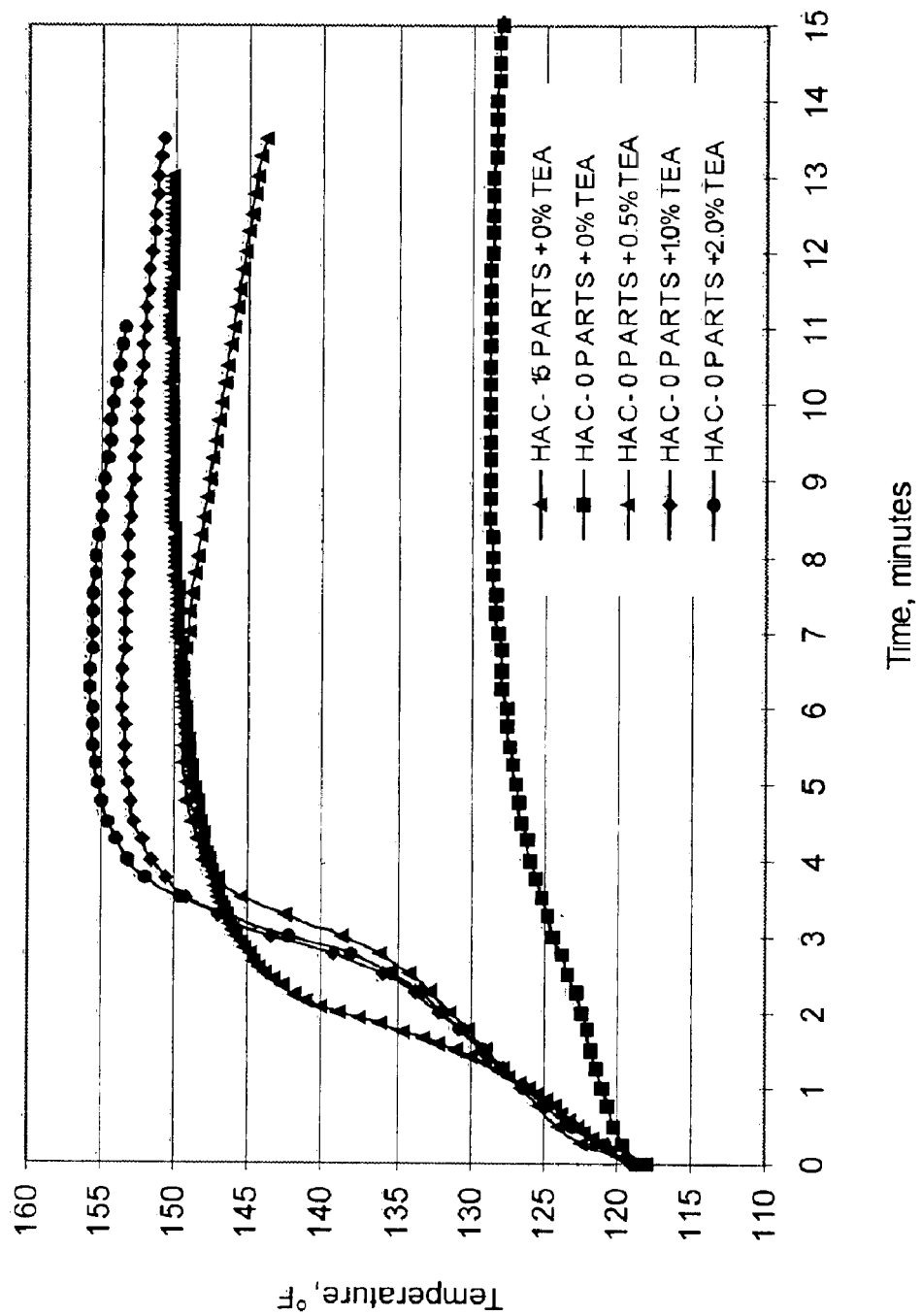
Figure 8:
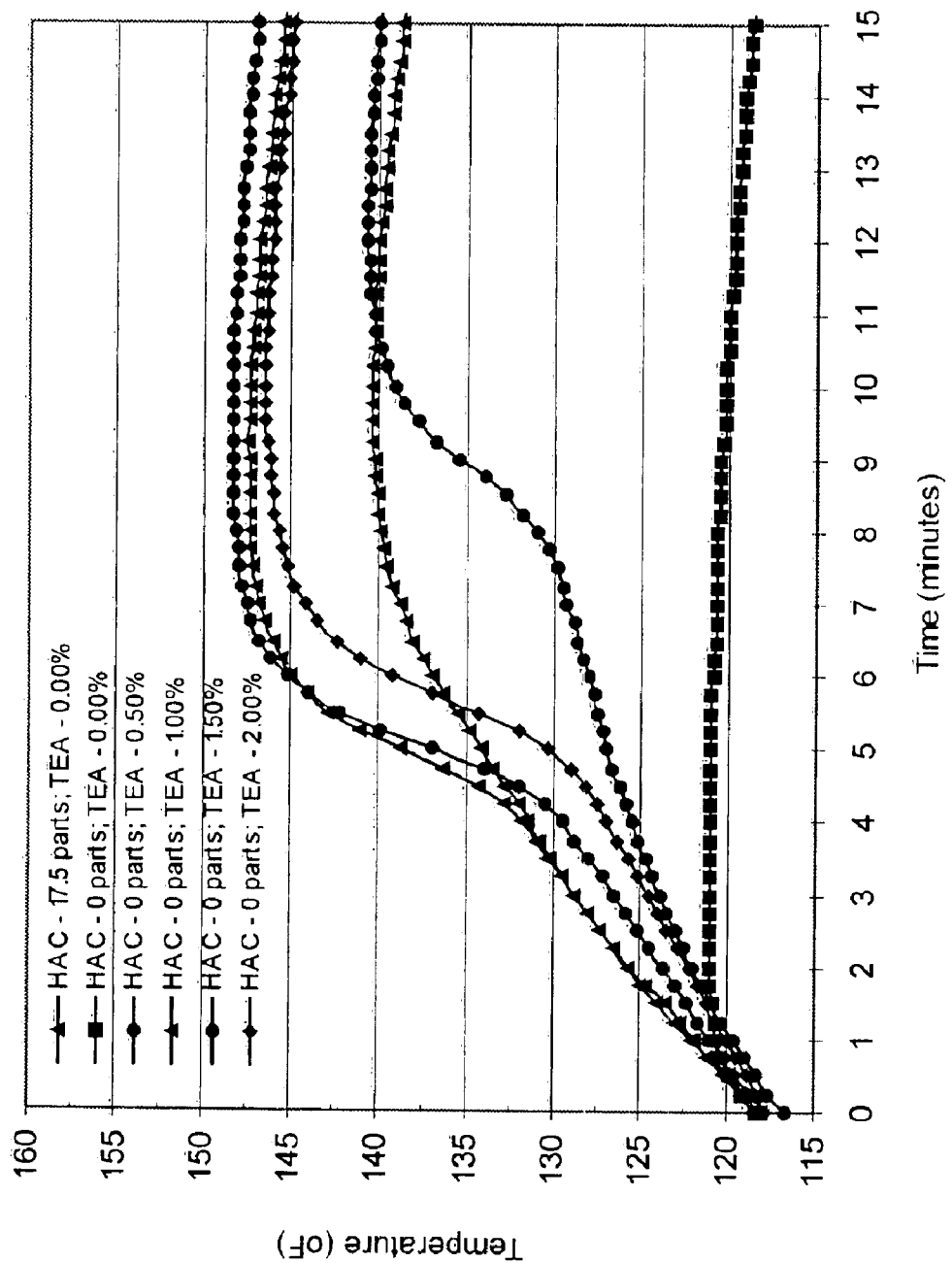
Figure 9:
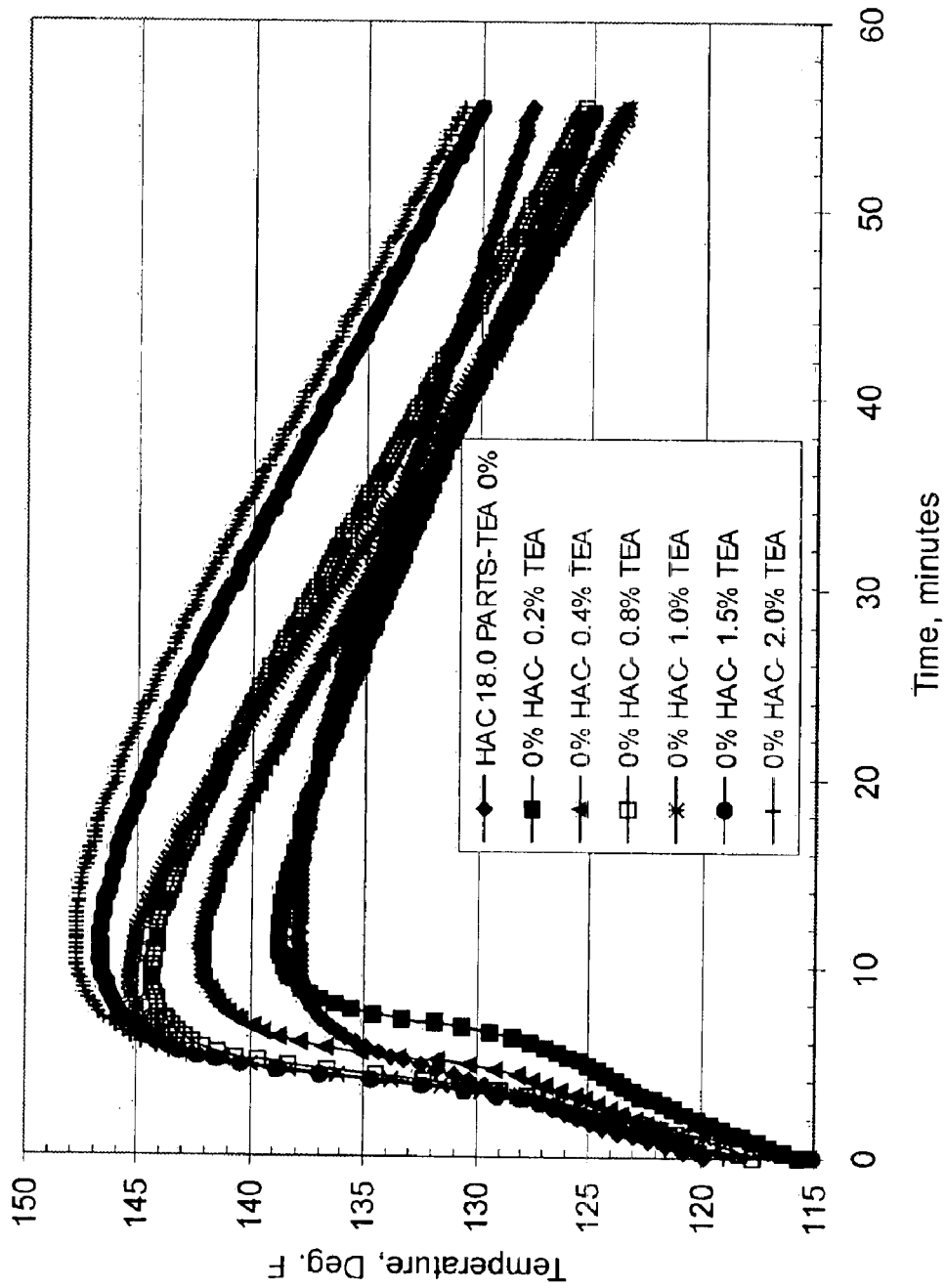
Figure 10:
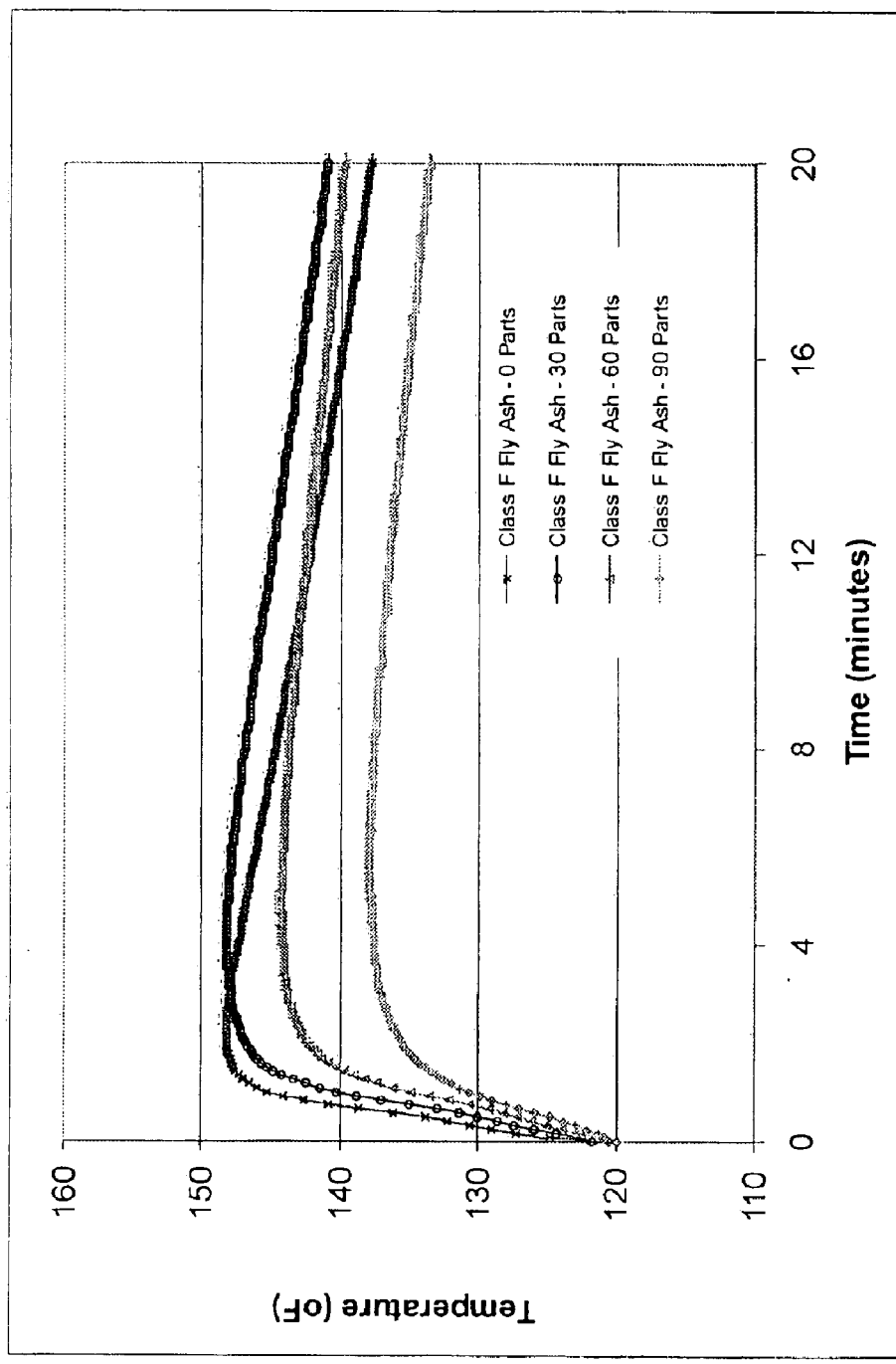
Figure 11:
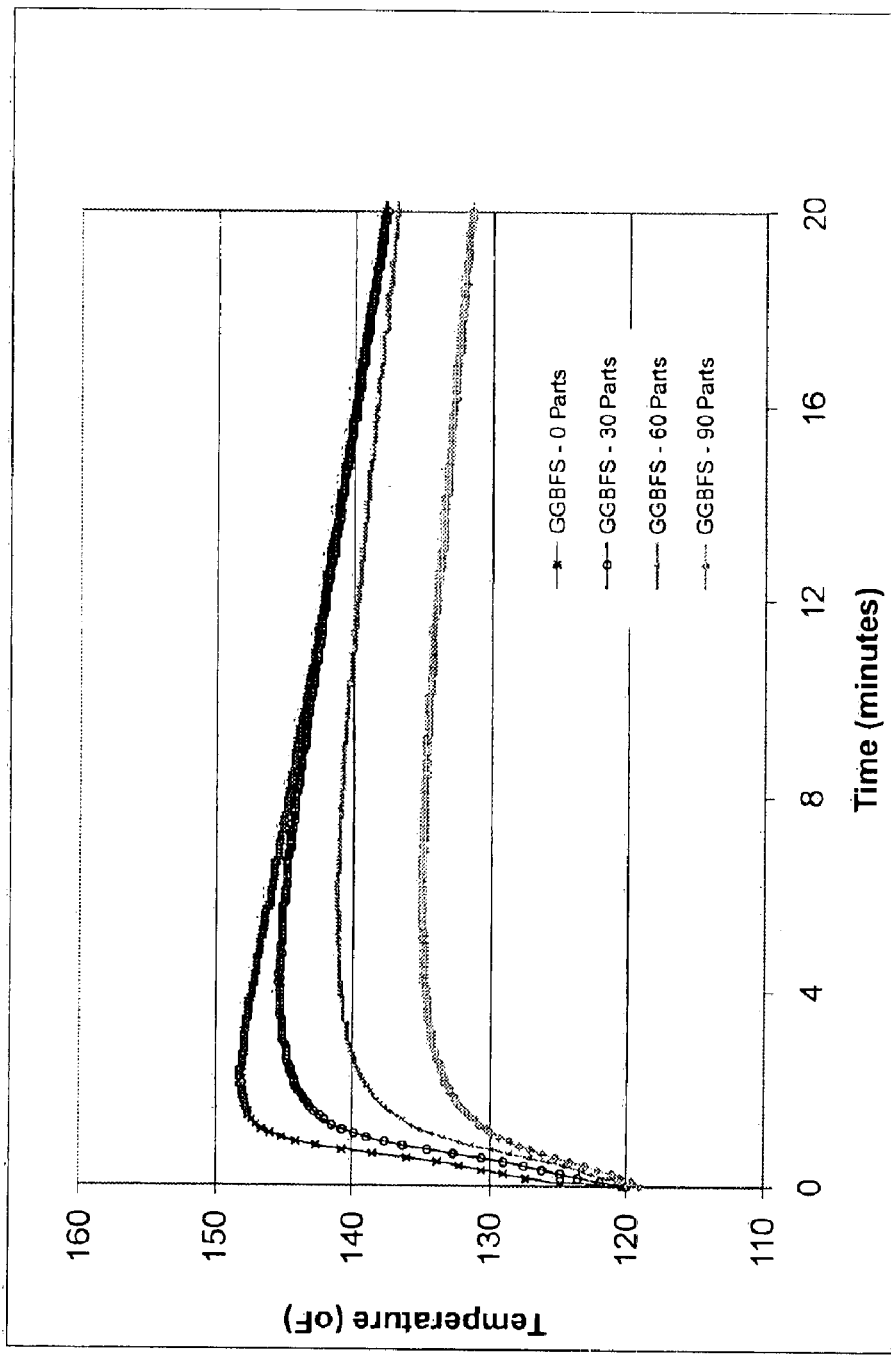
Figure 12:
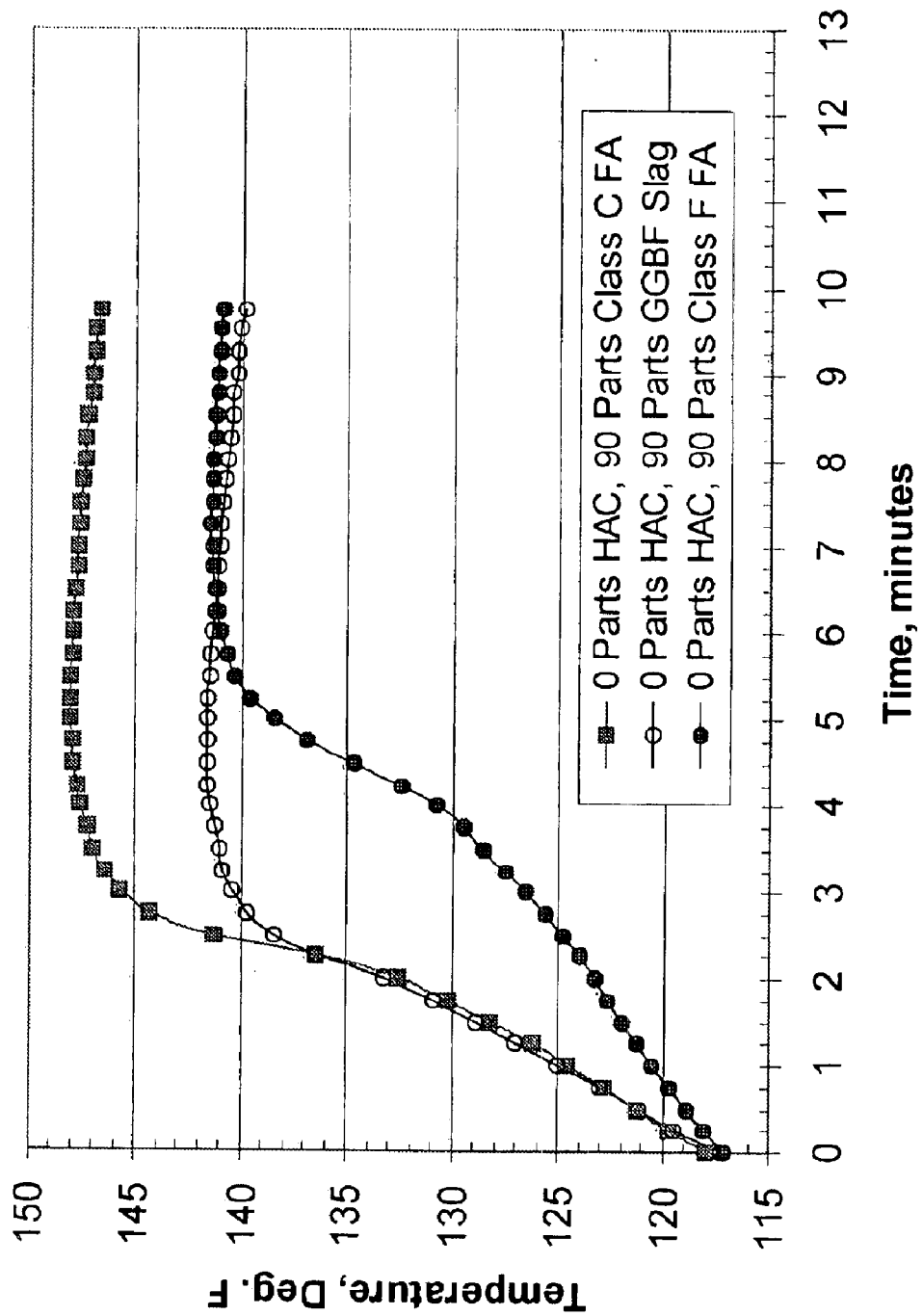
Figure 13:
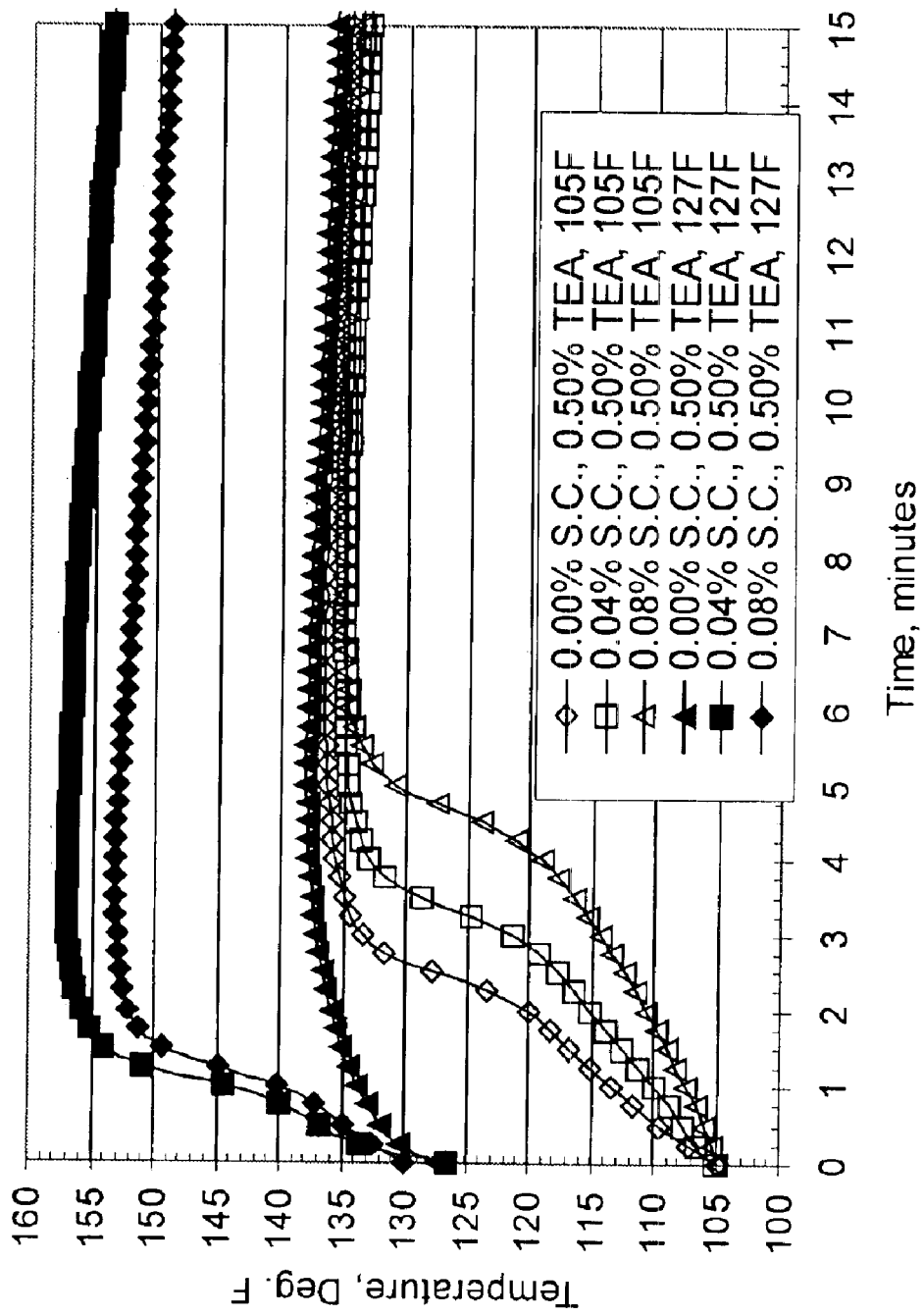

FIG. 1 is a graph of the results of Example 1.
FIG. 2 is a graph of the results of Example 2.
FIG. 3 is a graph of the results of Example 3.
FIG. 4 is a graph of the results of Example 4.
FIG. 5 is a graph of the results of Example 5.
FIG. 6 is a graph of the results of Example 6.
FIG. 7 is a graph of the results of Example 8
FIG. 8 is a graph of the results of Example 9
FIG. 9 is a graph of the results of Example 10
FIG. 10 is a graph of the results of Example 11
FIG. 11 is a graph of the results of Example 12
FIG. 12 is a graph of the results of Example 13.
FIG. 13 is a graph of the results of Example 17.

DETAILED DESCRIPTION OF THE INVENTION

Reactive Powder Blend

The principal ingredient of the reactive powder blend of the cementitious composition of the invention is a hydraulic cement, preferably portland cement. Other ingredients may include high alumina cement, calcium sulfate, and a mineral additive, preferably a pozzolan such as fly ash. Preferably, high alumina cement and calcium sulfate are used in small amounts and most preferably excluded, leaving only the hydraulic cement, the mineral additive, and an alkanolamine as an accelerator. When the composition includes only portland cement and fly ash, the reactive powder will contain 40–80 wt % portland cement and 20–60 wt % fly ash, based on the sum of these components. When the other ingredients are present, the reactive powder of the invention may contain 40–80 wt % portland cement, greater than zero up to 20 wt % high alumina cement, greater than zero up to 7 wt % calcium sulfate, and greater than zero up to 55 wt % fly ash based on the sum of these components The reactive powder blend of the invention in combination with an alkanolamine when mixed with water to provide an initial slurry temperature of at least 90° F. (32.2° C.), yields a rapid set of less than 60 minutes, more preferably less than 20 minutes, and most preferably in less than 10 minutes. Such rapid sets are made possible by providing the preferred amounts of the portland cement, high alumina cement, calcium sulfate, and the mineral additive in the composition (40–80 wt %, >0–20 wt %, >0–7 wt %, and >0–55 wt % respectively) and forming the initial slurry with water at elevated temperatures above 90° F. (32.2° C.) so that formation of ettringite and other hydrates of calcium aluminate compounds can take place as a result of the hydration of this reactive powder blend. Ettringite and other hydrates of calcium aluminate compounds form very rapidly in the hydration process thus imparting rapid set and rigidity to the mixtures made with the reactive powder blend of the cementitious composition of the invention. In manufacturing of cement-based products such as cement boards, it is primarily the formation of ettringite and other calcium aluminate hydrates that makes possible handling of cement boards within a few minutes after the cementitious composition of the invention is mixed with a suitable amount of water. As reported in the examples, setting of the composition is characterized by initial and final set times, as measured using Gillmore needles specified in the ASTM C266 test procedure. The final set time also corresponds to the time when a cement-based product e.g. a cement board, has sufficiently hardened so that it can be handled. It will be understood by those skilled in the art that curing reactions continue for extended periods after the final setting time has been reached.

Hydraulic Cement

Hydraulic cements, such as Portland cement, make up a substantial amount of the compositions of the invention. It is to be understood that, as used here, "hydraulic cement" does not include gypsum, which does not gain strength under water, although typically some gypsum is included in portland cement. ASTM C 150 standard specification for portland cement defines portland cement as a hydraulic cement produced by pulverizing clinker consisting essentially of hydraulic calcium silicates, usually containing one or more of the forms of calcium sulfate as an inter-ground addition. More generally, other hydraulic cements may be substituted for portland cement, for example calcium sulfo-aluminate based cements. To manufacture portland cement, an intimate mixture of limestone and clay is ignited in a kiln to form portland cement clinker. The following four main phases of portland cement are present in the clinker—tricalcium silicate ($3CaO.SiO_2$, also referred to as $C_3S$), dicalcium silicate ($2CaO.SiO_2$, called $C_2S$), tricalcium aluminate ($3CaO.Al_2O_3$ or $C_3A$), and tetracalcium aluminoferrite ($4CaO.Al_2O_3.Fe_2O_3$ or $C_4AF$). The resulting clinker containing the above compounds is inter-ground with calcium sulfates to desired fineness to produce the portland cement. The other compounds present in minor amounts in portland cement include double salts of alkaline sulfates, calcium oxide, and magnesium oxide. When cement boards are to be made, the portland cement will typically be in the form of very fine particles such that the particle surface area is greater than 4,000 $cm^2$/gram and typically between 5,000 to 6,000 $cm^2$/gram as measured by the Blaine surface area method (ASTM C 204). Of the various recognized classes of portland cement, ASTM Type III portland cement is most preferred in the reactive powder blend of the cementitious compositions of the invention. This is due to its relatively faster reactivity and high early strength development. In the present invention, the need for the use of Type III portland cement is minimized and relatively fast early age strength development can be obtained using a Type I instead of Type III portland cement. The other recognized types of hydraulic cements including white cement, slag cements such as blast-furnace slag cement, pozzolan blended cements, expansive cements, sulfo-aluminate cements, and oil-well cements may be used to replace or supplement portland cement in the composition of the invention.

Mineral Additives

Mineral additives possessing substantial, little, or no cementing properties may be included in the rapid setting composition of the invention. Mineral additives having pozzolanic properties such as fly ash are particularly preferred in the reactive powder of the invention. A distinctive feature of the present invention is that the hydraulic cement may be partially substituted by mineral additives possessing substantial, little, or no cementing properties, particularly pozzolanic materials, for example fly ash in substantial quantities.

ASTM C618-97 defines pozzolanic materials as "siliceous or siliceous and aluminous materials which in themselves possess little or no cementitious value, but will, in finely divided form and in the presence of moisture, chemically react with calcium hydroxide at ordinary temperatures to form compounds possessing cementitious properties." Various natural and man-made materials have been referred to as pozzolanic materials possessing pozzolanic properties. Some examples of pozzolanic materials include pumice, perlite, diatomaceous earth, silica fume, tuff, trass, rice husk, metakaolin, ground granulated blast furnace slag, and fly ash. All of these pozolanic materials can be used either singly or in combined form as part of the reactive powder blend of the invention. Fly ash is the preferred pozzolan in the reactive powder blend of the invention. Fly ashes containing high calcium oxide and calcium aluminate content (such as Class C fly ashes of ASTM C618 standard) are preferred. Other mineral additives such as calcium carbonate, vermiculite, clays, and crushed mica may also be included as mineral additives.

Fly ash is a fine powder byproduct formed from the combustion of coal. Electric power plant utility boilers burning pulverized coal produce most commercially available fly ashes. These fly ashes consist mainly of glassy spherical particles as well as residues of hematite and magnetite, char, and some crystalline phases formed during cooling. The structure, composition and properties of fly ash particles depend upon the structure and composition of the coal and the combustion processes by which fly ash is formed. ASTM C618 standard recognizes two major classes of fly ashes for use in concrete—Class C and Class F. These two classes of fly ashes are derived from different kinds of coals that are a result of differences in the coal formation processes occurring over geological time periods. Class F fly ash is normally produced from burning anthracite or bituminous coal, whereas Class C fly ash is normally produced from lignite or sub-bituminous coal. The ASTM C618 standard differentiates Class F and Class C fly ashes primarily according to their pozzolanic properties. Accordingly, in the ASTM C618 standard, the major specification difference between the Class F fly ash and Class C fly ash is the minimum limit of $SiO_2+Al_2O_3+Fe_2O_3$ in the composition. The minimum limit of $SiO_2+Al_2O_3+Fe_2O_3$ for Class F fly ash is 70% and for Class C fly ash is 50%. Thus, Class F fly ashes are more pozzolanic than the Class C fly ashes. Although not explicitly recognized in the ASTM C618 standard, Class C fly ashes typically contain high calcium oxide content. Presence of high calcium oxide content makes Class C fly ashes possess cementitious properties leading to the formation of calcium silicate and calcium aluminate hydrates when mixed with water. As will be seen in the examples below, Class C fly ash has been found to provide superior results, particularly in the preferred formulations in which high alumina cement and gypsum are not used. The weight ratio of the pozzolanic material to the portland cement in the reactive powder blend used in the cementitious composition of the invention may be about 0/100 to 150/100, preferably 75/100 to 125/100. In some reactive powder blends the portland cement is about 40 to 80 wt % and fly ash 20 to 60 wt %.

High Alumina Cement

High alumina cement (HAC) is another type of hydraulic cement that forms a component of the reactive powder blend of some of the embodiments of the invention. High alumina cement is also commonly referred to as aluminous cement or calcium aluminate cement. As the name implies, high alumina cements have a high alumina content, about 36–42 wt % is typical. Higher purity high alumina cements are also commercially available in which the alumina content can range as high as 80 wt %. These higher purity high alumina cements tend to be very expensive relative to other cements. The high alumina cements used in the compositions of the invention are finely ground to facilitate entry of the aluminates into the aqueous phase so that rapid formation of ettringite and other calcium aluminate hydrates can take place. The surface area of the high alumina cement used in the composition of the invention will be greater than 3,000 cm$^2$/gram and typically about 4,000 to 6,000 cm$^2$/gram as measured by the Blaine surface area method (ASTM C 204).

Several manufacturing methods have emerged to produce high alumina cement worldwide. Typically, the main raw materials used in the manufacturing high alumina cement are bauxite and limestone. One manufacturing method that has been used in the US for producing high alumina cement is described as follows. The bauxite ore is first crushed and dried, then ground along with limestone. The dry powder comprising of bauxite and limestone is then fed into a rotary kiln. A pulverized low-ash coal is used as fuel in the kiln. Reaction between bauxite and limestone takes place in the kiln and the molten product collects in the lower end of the kiln and pours into a trough set at the bottom. The molten clinker is quenched with water to form granulates of the clinker, which is then conveyed to a stock-pile. This granulate is then ground to the desired fineness to produce the final cement. Several calcium aluminate compounds are formed during the manufacturing process of high alumina cement. The predominant compound formed is monocalcium aluminate (CA). The other calcium aluminate and calcium silicate compounds that are formed include $C_{12}A_7$, $CA_2$, $C_2S$, $C_2AS$. Several other compounds containing relatively high proportion of iron oxides are also formed. These include calcium ferrites such as CF and $C_2F$, and calcium aluminoferrites such as $C_4AF$, $C_6AF_2$ and $C_6A_2F$. Other minor constituents present in the high alumina cement include magnesia (MgO), titania (TiO$_2$), sulfates and alkalis. It should be noted that tri-calcium aluminate ($C_3A$) seen in ordinary portland cement is not found in high alumina cements.

Calcium Sulfate

Various forms of calcium sulfate as shown below may be used in the invention to provide sulfate ions needed for forming ettringite and other calcium sulfo-aluminate hydrate compounds:

Dihydrate—CaSO$_4$.2H$_2$O (commonly known as gypsum)

Hemihydrate—CaSO$_4$.½H$_2$O (commonly known as stucco)

Anhydrite—CaSO$_4$ (also referred to as anhydrous calcium sulfate)

Land plaster is a relatively low purity gypsum and is preferred due to economic considerations, although higher purity grades of gypsum could be used. Land plaster is made from quarried gypsum and ground to relatively small particles such that the specific surface area is greater than 2,000 cm$^2$/gram and typically about 4,000 to 6,000 cm$^2$/gram as measured by the Blaine surface area method (ASTM C 204). The fine particles are readily dissolved and supply the gypsum needed to form ettringite. Synthetic gypsum obtained as a by-product from various manufacturing industries can also be used as a preferred calcium sulfate in the present invention. The other two forms of calcium sulfate, namely, hemihydrate and anhydrite may also be used in the present invention instead of gypsum, i.e., the dihydrate form of calcium sulfate.

Alkanolamines

The inventors have discovered that addition of alkanolamines has a significant influence on the rapid setting characteristics of the cementitious compositions of the invention when initiated at elevated temperatures. It has been found that addition of alkanolamines under conditions that yield an initial slurry temperature greater than 90° F. allows a significant reduction in HAC from the reactive powder blend of the cementitious compositions of the invention. It is noteworthy that the degree of rapid set obtained with the addition of an appropriate dosage of alkanolamine in combination with appropriate initiation conditions can be such that the use of HAC as a necessary component in the cementitious mixture can be completely avoided. This is a major development in the field of fast setting cement chemistry since the current state-of-the-art inherently assumes that the HAC is a necessary and fundamental component of the rapid setting cementitious mixtures for achieving rapid setting characteristics of the order described by Galer et al. In the present invention, different varieties of alkanolamines can be used alone or in combination to accelerate the setting characteristics of the cementitious composition of the invention. Some examples of useful alkanolamines include monoethanolamine [NH$_2$(CH$_2$—CH$_2$OH)], diethanolamine [NH(CH$_2$—CH$_2$OH)$_2$], and triethanolamine [N(CH$_2$—CH$_2$OH)$_3$]. Triethanolamine is the most preferred alkanolamine in the present invention. Alkanolamines are amino alcohols that are strongly alkaline and cation active. The present inventors believe that alkanolamines act as catalysts to accelerate the reactions of calcium aluminates and calcium silicates phases present in cementitious composition of the invention. Since high alumina cements may be completely excluded from the composition, it is believed that the alkanolamines interact with Portland cement to provide the aluminates and sulfate ions needed for the formation of ettringite and other hydrates based on calcium aluminate compounds. When the alkanolamine is triethanolamine, it will be used at a dosage of about 0.03 to 4.0 wt %, preferably 0.05 to 2.0 wt %, most preferably 0.05 to 1.0 wt % based on the reactive cementitious components of the invention.

Retarders

Use of set retarders as a component in the compositions of the invention is particularly critical in situations where the initial slurry temperatures used to form the cement-based products are particularly high, typically greater than 105° F. At relatively high initial slurry temperatures, typically greater than 105° F., retarders such as sodium citrate promote synergistic physical interaction and chemical reaction between different reactive components in the compositions resulting in favorable slurry temperature rise response and rapid setting behavior. Without the addition of retarders, stiffening of the reactive powder blend of the invention may occur very rapidly, soon after water is added to the mixture. Rapid stiffening of the mixture, also referred to here as "false setting" is undesirable, since it interferes with the proper and complete formation of ettringite, hinders with the normal formation of calcium silicate hydrates at later stages, and leads to development of extremely poor and weak microstructure of the hardened cementitious mortar. The primary function of a retarder in the composition is to keep the slurry mixture from stiffening too rapidly thereby promoting synergistic physical interaction and chemical reaction between the different reactive components. Other secondary benefits derived from the addition of retarder in the composition include reduction in the amount of superplasticizer and/or water required to achieve a slurry mixture of workable consistency. All of the aforementioned benefits are achieved due to suppression of false setting. Examples of some useful set retarders include sodium citrate, citric acid, potassium tartrate, sodium tartrate, and the like. In the compositions of the invention, sodium citrate is the preferred set retarder. Examples presented below will clearly demonstrate the synergistic roles of set retarder (sodium citrate), alkanolamines (triethanolamine) and slurry temperature.

Furthermore, since set retarders prevent the slurry mixture from stiffening too rapidly, their addition plays an important role and is instrumental in the formation of good edges during the cement board manufacturing process. The weight ratio of the set retarder to the reactive powder blend generally is less than 1.0 wt %, preferably about 0.04–1.0 wt %.

Inorganic Accelerators

As discussed previously, alkanolamines are primarily responsible for imparting extremely fast rapid setting characteristics to the cementitious mixtures. In combination with alkanolamines, inorganic accelerators may also be added as secondary accelerators in the cementitious composition of the invention. Addition of these secondary accelerators is expected to impart only a small reduction in setting time in comparison to the reduction achieved due to the addition of alkanolamines alone. Examples of such set accelerators include a sodium carbonate, potassium carbonate, calcium nitrate, calcium nitrite, calcium formate, calcium acetate, calcium chloride, lithium carbonate, lithium nitrate, lithium nitrite, aluminum sulfate and the like. The use of calcium chloride should be avoided when corrosion of cement board fasteners is of concern. The weight ratio of the inorganic accelerator to the reactive powder blend typically will be less than 2 wt %, preferably about 0.1 to 1.0 wt %. These accelerators can be used alone or in combination.

Other Chemical Additives and Ingredients

Chemical additives such as water reducing agents (superplasticizers), may be included in the compositions of the invention. They may be added in the dry form or in the form of a solution. Superplasticizers help to reduce the water demand of the mixture. Examples of superplasticizers include polynapthalene sulfonates, polyacrylates, polycarboxylates, lignosulfonates, melamine sulfonates, and the like. Depending upon the type of superplasticizer used, the weight ratio of the superplasticizer (on dry powder basis) to the reactive powder blend typically will be about 2 wt % or less, preferably about 0.1 to 1.0 wt %.

When it is desired to produce lightweight products such as lightweight cement boards, air-entraining agents may be added in the composition to lighten the product. Alternatively, externally produced foam formed using foaming agents may be introduced in to the mixtures of the compositions of the invention during the mixing operation with an objective of reducing the density of the product. Other chemical admixtures such as shrinkage control agents, coloring agents, viscosity modifying agents (thickeners) and internal curing agents may also be added in the compositions of the invention if desired.

Discrete reinforcing fibers of different types may also be included in the cementitious compositions of the invention. Scrims made of materials such as polymer-coated glass fibers and polymeric materials such as polypropylene, polyethylene and nylon may be used to reinforce the cement-based product depending upon its function and application. Cement boards produced according the present invention are typically reinforced with scrims made of polymer-coated glass fibers.

The cementitious composition of the invention will be combined with a suitable amount of water to hydrate the reactive powder blend and to rapidly form ettringite and other hydrates of calcium aluminate compounds. Generally, the amount of water added will be greater than that is theoretically required for the hydration of the reactive powder blend. This increased water demand is allowed to facilitate the workability of the cementitious slurry. Typically, the weight ratio of the water to reactive powder blend is about 0.20/1 to 0.80/1, preferably about 0.30/1 to 0.60/1. The amount of water required will depend on the needs of the individual materials present in the cementitious composition.

Aggregates and Fillers

While the disclosed reactive powder blend defines the rapid setting component of the cementitious composition of the invention, it will be understood by those skilled in the art that other materials may be included in the composition depending on its intended use and application. For instance, for cement board applications, it is desirable to produce lightweight boards without unduly comprising the essential mechanical properties of the product. This objective is achieved by adding lightweight aggregates and fillers. Examples of useful lightweight aggregates and fillers include blast furnace slag, volcanic tuff, pumice, expanded forms of clay, shale, and perlite, hollow ceramic spheres, hollow plastic spheres, expanded plastic beads, and the like. For producing cement boards, expanded clay and shale aggregates are particularly useful. Expanded plastic beads and hollow plastic spheres when used in the composition are required in very small quantity on weight basis owing to their extremely low bulk density. Depending on the choice of lightweight aggregate or filler selected, the weight ratio of the lightweight aggregate or filler to the reactive powder blend may be about 1/100 to 200/100, preferably about 2/100 to 125/100. For example, for making lightweight cement boards, the weight ratio of the lightweight aggregate or filler to the reactive powder blend preferably will be about 2/100 to 125/100. In applications where the lightweight product feature is not a critical criterion, river sand and coarse aggregate as normally used in concrete construction may be utilized as part of the composition of the invention.

In the examples below it will be seen that the moisture content of aggregates adversely affects the setting time of the cementitious mixtures, thus aggregates and fillers having a low water content are preferred in the present invention.

Initial Slurry Temperature

The cement literature (Ramachandran, Cem. Concr. Res. 6 (pp. 623–631) teaches away from preparing concrete mortars with relatively high initial temperatures because it leads to false set and poor strength development. In fact, hot weather concreting specifications require that the concrete when placed should have a temperature of less than 85° F. or 90° F. (*Design and Control of Concrete Mixtures*, PCA, Thirteenth Edition P. 130).

In the present invention, forming the slurry under conditions which provide an initially high slurry temperature was found to be important to achieve rapid setting and hardening of cementitious formulations. The initial slurry temperature should be at least about 90° F. (32.2° C.). Slurry temperatures in the range of 90° F. to 135° F. (32.2° to 57.2° C.) produce very short setting times.

In general, within this range increasing the initial temperature of the slurry increases the rate of temperature rise as the reactions proceed and reduces the setting time. Thus, an initial slurry temperature of 95° F. (35° C.) is preferred over an initial slurry temperature of 90° F. (32.2° C.), a temperature of 100° F. (37.8° C.) is preferred over 95° F., a temperature of 105° F. (40.6° C.) is preferred over 100° F., a temperature of 110° F. (43.3° C.) is preferred over 105° F. and so on. It is believed that the benefits of increasing the initial slurry temperature are decreased as the upper end of the broad temperature range is approached.

As will be understood by those skilled in the art, achieving an initial slurry temperature may be accomplished by more than one method. Perhaps the most convenient method is to heat one or more of the components of the slurry. In the examples, the present inventors supplied water heated to a temperature such that, when added to the dry reactive powders and unreactive solids, the resulting slurry is at the desired temperature. Alternatively, the solids could be provided at above ambient temperatures if desired. Using steam to provide heat to the slurry is another possible method that could be adopted. Although not preferred, a slurry could be prepared at ambient temperatures and promptly heated to raise the temperature to about 90° F. or higher, where the benefits of the invention can be achieved. The optimum initial slurry temperature is believed to be in the range of about 110° F. to 120° F. (43.3° to 48.9° C.).

Manufacturing of Precast Concrete Products Such as Cement Boards

Precast concrete products such as cement boards are manufactured most efficiently in a continuous process in which the reactive powder blend is blended with aggregates, fillers and other necessary ingredients, followed by addition of water and other chemical additives just prior to placing the mixture in a mold or over a continuous casting and forming belt. Due to the rapid setting characteristics of the cementitious mixture it should be appreciated that the mixing of dry components of the cementitious blend with water usually will be done just prior to the casting operation. As a consequence of the formation of hydrates of calcium aluminate compounds and the associated water consumption in substantial quantities the cement-based product becomes rigid, ready to be cut, handled and stacked for further curing.

In the following examples, experimental studies were conducted to investigate the influence of alkanolamine addition on the slurry temperature rise behavior and setting characteristics of the cementitious mixture compositions of the invention. The raw materials and ingredients used in these investigations were as follows:

Portland Cement Type III supplied by Capitol Cement of San Antonio, Tex.

Block Portland Cement supplied by California Portland Cement Company

Portland Cement Type III supplied by Mitsubishi Cement Company, California

Gypsum (Land Plaster) supplied by USG Company, Illinois

High Alumina Cement (HAC) supplied by Lafarge Calcium Aluminates

Fly Ash Class C supplied by Bayshore Station, Cleveland, Ohio. and

Fly Ash Class F supplied by Boral Material Technologies, Texas

Ground Granulated Blast Furnace Slag (NewCem) supplied by Lafarge Corporation, Virginia Haydite expanded shale aggregate supplied by Hydraulic Brick Press, Brooklyn, Ind.

Ridgelite expanded clay aggregate supplied by TXI Aggregate, Texas

Triethanolamine (TEA) supplied by Union Carbide Corp., Danbury, Conn.

Sodium Carbonate (SA) supplied by FMC Wyoming Corp., Philadelphia, Pa.

Sodium Citrate supplied by FMC Wyoming Corp., Philadelphia, Pa.

Superplasticizer Sulfonated Naphtalene Condensate supplied by Geo Specialty Chemicals, Inc., Cedartown, Ga.

In the examples below, the dry reactive powder ingredients and any aggregate used were mixed with water under conditions which provided an initial slurry temperature above ambient. TEA was added as received or in an aqueous solution. Typically hot water was used having a temperature which produced a slurry having an initial temperature within the range of 90°–135° F. (32.2–57.2° C.). Examples 14–17 report the effect of changes in the initial slurry temperature.

EXAMPLE 1

This example shows the influence of alkanolamine addition on the slurry temperature rise behavior and setting characteristics of the cementitious compositions of the invention containing expanded shale aggregate in moist condition. Table 1 shows the cementitious mixture compositions investigated in this example. The slurry temperature rise behavior for the various mixes investigated in this example are shown in FIG. 1.

TABLE 1

Mixture compositions evaluated in Example 1[1]

| | Reactive Powder Blend (parts/100 parts of Portland Cement) | | | | TEA | Aggregate[2] | |
|---|---|---|---|---|---|---|---|
| Mix Id. | Portland Cement (PC) | Fly Ash - Class C (FA) | High Alumina Cement (HAC) | Gypsum (G) | wt % of reactive powder blend | Condition | wt % of reactive powder blend |
| Mix 1 - Conventional #1 | 100 | 90 | 16 | 5.3 | 0.0 | Dry | 90 |
| Mix 2 - Conventional #2 | 100 | 90 | 16 | 5.3 | 0.0 | Moist[3] | 90 |
| Mix 3 - Invention #1 | 100 | 90 | 16 | 5.3 | 1.0 | Moist[3] | 90 |
| Mix 4 - Invention #2 | 100 | 90 | 16 | 5.3 | 2.0 | Moist[3] | 90 |
| Mix 5 - Invention #3 | 100 | 90 | 16 | 5.3 | 1.0 | Moist[3] | 90 |

[1]Sodium citrate 0.04 wt % of reactive powder blend Superplasticizer 0.40 wt % of reactive powder blend Sodium carbonate 0.10% of reactive powder blend for Mix 1 to 4 and 0.05% of reactive powder blend for Mix 2 Water/reactive powder weight ratio - 0.35
[2]Expanded shale aggregate
[3]Moisture content of aggregate - 5%

From FIG. 1 it can be clearly seen that the mixture with dry aggregate (Mix 1) provides a very rapid slurry temperature rise behavior. However, when aggregate with 5% moisture content were used (Mix 2), the rate of slurry temperature rise was much slower and the maximum temperature was about 10° F. lower in comparison to Mix 1 utilizing dry aggregate. Thus, it can be observed that use of moist aggregate in the mixture composition negatively impacts the overall slurry temperature rise behavior and the corresponding setting characteristics of the cementitious composition. However, when triethanolamine (TEA) was added in the mixtures containing moist aggregate (Mixes 3 to 5), the rate of slurry temperature rise increased significantly, and the maximum temperature achieved was similar to that found for the mixture with dry aggregate (Mix 1). It should be noted that a faster rate of slurry temperature rise and a higher maximum slurry temperature attained are indicative of a more rapid setting behavior of the cementitious slurry.

EXAMPLE 2

In Example 2, the slurry temperature rise behavior was investigated for mixture compositions containing more fly ash and less aggregate relative to the mixture compositions investigated in Example 1. Table 2 shows the mixture compositions investigated in this example.

TABLE 2

Mixture compositions evaluated in Example 2[1]

| | Reactive Powder Blend (parts/100 parts of Portland Cement) | | | | TEA | Aggregate[2] | |
|---|---|---|---|---|---|---|---|
| Mix Id. | Portland Cement (PC) | Fly Ash - Class C (FA) | High Alumina Cement (HAC) | Gypsum (G) | wt % of reactive powder blend | Condition | wt % of reactive powder blend |
| Mix 1 - Conventional #1 | 100 | 90 | 16 | 5.3 | 0.0 | Dry | 90 |
| Mix 2 - Conventional #2 | 100 | 90 | 16 | 5.3 | 0.0 | Moist[3] | 90 |
| Mix 3 - Conventional #3 | 100 | 110 | 16 | 5.3 | 0.0 | Moist[3] | 75 |
| Mix 4 - Invention #1 | 100 | 110 | 16 | 5.3 | 1.0 | Moist[3] | 75 |
| Mix 5 - Invention #2 | 100 | 110 | 16 | 5.3 | 2.0 | Moist[3] | 75 |

[1]Sodium citrate 0.07 wt % of reactive powder blend Superplasticizer 0.40 wt % of reactive powder blend Sodium carbonate 0.20% of reactive powder blend Water/reactive powder weight ratio - 0.40
[2]Expanded shale aggregate
[3]Moisture content of aggregate - 5%

From FIG. 2 it can be seen that use of moist aggregate has a negative influence on the overall slurry temperature rise behavior (Mixes 2 and 3). Not only is the rate of slurry temperature rise much slower but the maximum slurry temperature attained is much lower in comparison to the mixture containing dry aggregate. From the figure, it can be noted that addition of triethanolamine (TEA) to the mixture compositions containing moist aggregate (Mixes 4 and 5) had a significant influence on the rate of slurry temperature rise and the maximum slurry temperature attained. As a consequence of the addition of TEA, the rate of slurry temperature rise increased significantly and also the maximum slurry temperature attained was much higher than the mixture containing no TEA. It should be noted that a faster rate of slurry temperature rise and a higher maximum slurry temperature are indicative of a more rapid setting behavior of the cementitious slurry.

EXAMPLE 3

In Example 3, the slurry temperature rise behavior was investigated for mixture compositions containing aggregate with 18% moisture content rather than 5% as in Example 2. Table 3 shows the cementitious mixture compositions investigated in this example. As can be seen in FIG. 3, the beneficial effects of the addition of triethanolamine (TEA) were similar to those observed in Example 2, except that the higher moisture content of the aggregate appeared to have reduced the maximum temperature rise by a small amount.

TABLE 3

Mixture compositions evaluated in Example 3[1]

| | Reactive Powder Blend (parts/100 parts of Portland Cement) | | | | TEA | Aggregate[2] | |
|---|---|---|---|---|---|---|---|
| Mix Id. | Portland Cement (PC) | Fly Ash - Class C (FA) | High Alumina Cement (HAC) | Gypsum (G) | wt % of reactive powder blend | Condition | wt % of reactive powder blend |
| Mix 1 - Conventional #1 | 100 | 90 | 16 | 5.3 | 0.0 | Dry | 90 |
| Mix 2 - Conventional #2 | 100 | 90 | 16 | 5.3 | 0.0 | Moist[3] | 90 |
| Mix 3 - Conventional #3 | 100 | 110 | 16 | 5.3 | 0.0 | Moist[3] | 75 |
| Mix 4 - Invention #1 | 100 | 110 | 16 | 5.3 | 1.0 | Moist[3] | 75 |
| Mix 5 - Invention #2 | 100 | 110 | 16 | 5.3 | 2.0 | Moist[3] | 75 |

[1]Sodium citrate 0.07 wt % of reactive powder blend Superplasticizer 0.40 wt % of reactive powder blend Sodium carbonate 0.20% of reactive powder blend Water/reactive powder weight ratio - 0.40
[2]Expanded shale aggregate
[3]Moisture content of aggregate - 18%

EXAMPLE 4

In Example 4, influence of triethanolamine (TEA) addition at varying dosages of HAC on slurry temperature rise behavior was investigated. Table 4 shows the cementitious mixture compositions investigated in this example.

TABLE 4

Mixture compositions evaluated in Example 4[1]

| Mix Id. | Reactive Powder Blend (parts/100 parts of Portland Cement) | | | | TEA | Aggregate[2] | |
|---|---|---|---|---|---|---|---|
| | Portland Cement (PC) | Fly Ash - Class C (FA) | High Alumina Cement (HAC) | Gypsum (G) | wt % of reactive powder blend | Condition | wt % of reactive powder blend |
| Mix 1 - Conventional #1 | 100 | 90 | 16 | 5.3 | 0.0 | Dry | 90 |
| Mix 2 - Conventional #2 | 100 | 90 | 10 | 3.3 | 0.0 | Dry | 90 |
| Mix 3 - Conventional #3 | 100 | 90 | 8 | 2.7 | 0.0 | Dry | 90 |
| Mix 4 - Invention #1 | 100 | 90 | 16 | 5.3 | 0.5 | Dry | 90 |
| Mix 5 - Invention #2 | 100 | 90 | 10 | 3.3 | 1.0 | Dry | 90 |
| Mix 6 - Invention #3 | 100 | 90 | 8 | 2.7 | 1.5 | Dry | 90 |

[1]Sodium citrate 0.07 wt % of reactive powder blend Superplasticizer 0.40 wt % of reactive powder blend Sodium carbonate 0.25% of reactive powder blend Water/reactive powder weight ratio - 0.40
[2]Expanded shale aggregate From FIG. 4, beneficial effects of adding TEA can be clearly observed. At the same dosage of HAC, the mixture compositions containing TEA yield slurry temperature rise behavior significantly steeper than the mixture compositions containing no TEA. Moreover, the maximum temperature rise attained in the case of mixture compositions containing TEA is also significantly greater than the mixture compositions with no TEA. Note that adding only 0.5 wt % TEA to the composition containing 16 parts by weight of HAC increased the rate of slurry temperature rise markedly. Reducing the amount of HAC would be expected to reduce the maximum rise in slurry temperature, but adding TEA to the mixture compositions resulted in practically no change in slurry temperature rise behavior.

EXAMPLE 5

In Example 5, relative affects of TEA and sodium carbonate (SA) were determined. Table 5 shows the cementitious mixture compositions investigated in this example. Note that sodium carbonate is also considered an accelerator for setting of the cementitious compositions.

temperature attained are is markedly increased. Increasing the sodium carbonate content shows an insignificant change in slurry temperature rise behavior. Note that when the HAC content is decreased to 5 parts, the results are similar and no significant change appears to have resulted from increasing the sodium carbonate content.

EXAMPLE 6

The tests reported in Example 5 were further extended to determine the relative effects of TEA and sodium carbonate at a relatively low concentration of HAC. In total four mixture compositions were investigated with TEA content fixed at 1.5 wt % of the reactive powder blend and sodium carbonate dosage varied from 0.25 to 1.0 wt % of the reactive powder blend. The slurry temperature rise response for the mixture compositions investigated are shown in FIG. 6. It can be seen that increasing the amount of sodium

TABLE 5

Mixture compositions evaluated in Example 5[1]

| Mix Id. | Reactive Powder Blend (parts/100 parts of Portland Cement) | | | | TEA | Sodium Carbonate | Aggregate[2] | |
|---|---|---|---|---|---|---|---|---|
| | Portland Cement (PC) | Fly Ash - Class C (FA) | High Alumina Cement (HAC) | Gypsum (G) | wt % of reactive powder blend | wt % of reactive powder blend | Condition | wt % of reactive powder blend |
| Mix 1 - Conventional #1 | 100 | 90 | 8 | 5.3 | 0.0 | 0.25 | Dry | 90 |
| Mix 2 - Invention #1 | 100 | 90 | 8 | 5.3 | 1.5 | 0.25 | Dry | 90 |
| Mix 3 - Invention #2 | 100 | 90 | 8 | 5.3 | 2.0 | 0.25 | Dry | 90 |
| Mix 4 - Invention #3 | 100 | 90 | 8 | 5.3 | 1.5 | 0.50 | Dry | 90 |
| Mix 5 - Invention #4 | 100 | 90 | 5 | 1.7 | 1.5 | 0.25 | Dry | 90 |
| Mix 6 - Invention #5 | 100 | 90 | 5 | 1.7 | 1.0 | 1.00 | Dry | 90 |

[1]Sodium citrate 0.04 wt % of reactive powder blend Superplasticizer 0.40 wt % of reactive powder blend Water/reactive powder weight ratio - 0.40
[2]Expanded shale aggregate FIG. 5 clearly demonstrates that the mixture composition with 8 parts of HAC relative to 100 parts of Portland Cement, produces a very shallow slurry temperature rise curve, indicative of a very long setting time for the composition. When TEA is added to the mixture compositions, both the rate of slurry temperature rise and maximum slurry carbonate reduces the maximum slurry temperature achieved, although little effect is seen on the rate of slurry temperature rise.

EXAMPLE 7

In Example 7, relative effects of sodium carbonate on compressive strength were determined. Table 6 shows the cementitious mixture compositions investigated in this example.

TABLE 6

Mixture compositions evaluated in Example 7[1]

| Mix Id. | Reactive Powder Blend (parts/100 parts of Portland Cement) | | | | TEA | Sodium Carbonate | Aggregate[2] | |
|---|---|---|---|---|---|---|---|---|
| | Portland Cement (PC) | Fly Ash - Class C (FA) | High Alumina Cement (HAC) | Gypsum (G) | wt % of reactive powder blend | wt % of reactive powder blend | Condition | wt % of reactive powder blend |
| Mix 1 - Invention #1 | 100 | 90 | 0 | 0 | 0.50 | 0.0 | Dry | 90 |
| Mix 2 - Invention #2 | 100 | 90 | 0 | 0 | 0.50 | 0.20 | Dry | 90 |
| Mix 3 - Invention #3 | 100 | 90 | 0 | 0 | 0.50 | 0.40 | Dry | 90 |
| Mix 4 - Invention #4 | 100 | 90 | 0 | 0 | 0.50 | 0.60 | Dry | 90 |
| Mix 5 - Invention #5 | 100 | 90 | 0 | 0 | 0.50 | 0.80 | Dry | 90 |

[1]Sodium citrate 0.08 wt % of reactive powder blend Superplasticizer 0.50 wt % of reactive powder blend Water/reactive powder weight ratio - 0.40
[2]Expanded shale aggregate The cube compressive strengths (CCS) for the mixture compositions investigated in this example are shown in Table 7. Three cube specimens of size 2"×2"×2" (50.8 mm×50.8 mm×50.8 mm) were cast after mixing at 115° F. (46.1° C.) and then pouring into forms. The forms were held at room temperature about 75° F. (23.9° C.) and de-molded after 19 hours. After demolding, the specimens were placed in plastic bags and cured at 155° F. (68.3° C.) additional 48 hours. Note that the specimens were prepared without adding air-entraining agents yield an average mortar density of about 106 pcf (1701 kg/m$^3$). The data presented in Table 7 shows that adding sodium carbonate in the range of 0.2 to 0.8% increases the mortar compressive strength significantly compared to the mixes without sodium carbonate. It appears that an optimum concentration of sodium carbonate was within the range of concentration studied.

TABLE 7

Cube Compressive Strength (CCS) for compositions evaluated in Example 7[1]

| Mix Id. | Reactive Powder Blend (parts/100 parts of Portland Cement) | | | | TEA | Sodium Carbonate | Density pcf | CCS[1] psi |
|---|---|---|---|---|---|---|---|---|
| | Portland Cement (PC) | Fly Ash - Class C (FA) | High Alumina Cement (HAC) | Gypsum (G) | wt % of reactive powder blend | wt % of reactive powder blend | | |
| Mix 1 - Invention #1 | 100 | 90 | 0 | 0 | 0.50 | 0.0 | 107.2 | 5069 |
| Mix 2 - Invention #2 | 100 | 90 | 0 | 0 | 0.50 | 0.20 | 106.1 | 5285 |
| Mix 3 - Invention #3 | 100 | 90 | 0 | 0 | 0.50 | 0.40 | 105.6 | 5902 |
| Mix 4 - Invention #4 | 100 | 90 | 0 | 0 | 0.50 | 0.60 | 106.4 | 5210 |
| Mix 5 - Invention #5 | 100 | 90 | 0 | 0 | 0.50 | 0.80 | 105.9 | 5304 |

[1]Non-aerated mortars

EXAMPLE 8

Example 8 shows the influence of triethanolamine addition on the slurry temperature rise behavior for the mixture compositions in which the HAC dosage was reduced to 0 parts. Table 8 shows the cementitious mixture compositions investigated in this example.

TABLE 8

Mixture compositions evaluated in Example 7[1]

| Mix Id. | Reactive Powder Blend (parts/100 parts of Portland Cement) | | | | TEA | Aggregate[2] | |
|---|---|---|---|---|---|---|---|
| | Portland Cement (PC) | Fly Ash - Class C (FA) | High Alumina Cement (HAC) | Gypsum (G) | wt % of reactive powder blend | Condition | wt % of reactive powder blend |
| Mix 1 - Conventional #1 | 100 | 90 | 17.5 | 5.9 | 0.0 | Dry | 90 |
| Mix 2 - Conventional #2 | 100 | 90 | 0 | 0.0 | 0.0 | Dry | 90 |
| Mix 3 - Invention #1 | 100 | 90 | 0 | 0.0 | 0.5 | Dry | 90 |
| Mix 4 - Invention #2 | 100 | 90 | 0 | 0.0 | 1.0 | Dry | 90 |
| Mix 5 - Invention #3 | 100 | 90 | 0 | 0.0 | 2.0 | Dry | 90 |

[1]Sodium citrate 0.07 wt % of reactive powder blend Superplasticizer 0.50 wt % of reactive powder blend Sodium carbonate 0.20% of reactive powder blend Water/reactive powder weight ratio - 0.40
[2]Expanded shale aggregate The slurry temperature rise behavior for the mixture compositions investigated in this example are shown in FIG. 7 and their corresponding initial and final setting times are shown in Table 7. It can be observed that the mixture containing 17.5 parts of high alumina cement and 5.9 parts of gypsum (Mix 1) demonstrated a rapid temperature rise and reached a maximum temperature within 4–5 minutes. It is noteworthy that when both high alumina cement and gypsum were deleted (Mix 2), the rate of slurry temperature rise was much slower and the maximum temperature attained was also much lower in comparison to Mix 1. From Table 7 it can also be observed that the final setting time for this mixture was substantially longer than that for Mix 1. When triethanolamine was introduced in the mixture compositions containing no TEA (Mixes 3 to 5), the slurry temperature behavior improved significantly and approximated closely to the present state-of-the-art conventional mixture containing high alumina cement and gypsum (i.e., Mix 1). Moreover, the initial and final setting times for these mixture compositions (i.e., Mixes 3 to 5) were also very similar to the present state-of-the-art conventional mixture containing high alumina cement and gypsum (i.e., Mix 1).

TABLE 9

Initial and final setting times of mixture compositions of Example 7

| Mix Id. | Reactive Powder Blend (parts/100 parts of Portland Cement) | | | | TEA | Setting Times | |
|---|---|---|---|---|---|---|---|
| | Portland Cement (PC) | Fly Ash - Class C (FA) | High Alumina Cement (HAC) | Gypsum (G) | wt % of reactive powder blend | Initial Setting Time (min:sec) | Final Setting Time (min:sec) |
| Mix 1 - Conventional #1 | 100 | 90 | 17.5 | 5.9 | 0.0 | 5:00 | 6:46 |
| Mix 2 - Conventional #2 | 100 | 90 | 0 | 0.0 | 0.0 | 32:00 | 40:46 |
| Mix 3 - Invention #1 | 100 | 90 | 0 | 0.0 | 0.5 | 6:00 | 8:40 |
| Mix 4 - Invention #2 | 100 | 90 | 0 | 0.0 | 1.0 | 5:00 | 7:00 |
| Mix 5 - Invention #3 | 100 | 90 | 0 | 0.0 | 2.0 | 5:00 | 7:00 |

From Table 9 it is clear that use of triethanolamine provides a rapid set of the slurry comparable to that of the present state-of-the-art conventional mixture composition containing high alumina cement and gypsum. From the examples it can also be seen that removing high alumina cement and gypsum from the mixture composition without including triethanolamine provides an unacceptably long setting time (Mix 2).

EXAMPLE 9

The compositions of Example 8 were tested again, except that the aggregate used was moist with a moisture content of 5% instead of using dry aggregate as in Example 8. Table 10 shows the mixture compositions investigated in this example.

TABLE 10

Mixture compositions evaluated in Example 8[1]

| Mix Id. | Reactive Powder Blend (parts/100 parts of Portland Cement) | | | | TEA | Aggregate[2] | |
|---|---|---|---|---|---|---|---|
| | Portland Cement (PC) | Fly Ash - Class C (FA) | High Alumina Cement (HAC) | Gypsum (G) | wt % of reactive powder blend | Condition | wt % of reactive powder blend |
| Mix 1 - Conventional #1 | 100 | 90 | 17.5 | 5.9 | 0.0 | Moist[3] | 90 |
| Mix 2 - Conventional #2 | 100 | 90 | 0 | 0.0 | 0.0 | Moist[3] | 90 |
| Mix 3 - Invention #1 | 100 | 90 | 0 | 0.0 | 0.5 | Moist[3] | 90 |
| Mix 4 - Invention #2 | 100 | 90 | 0 | 0.0 | 1.0 | Moist[3] | 90 |
| Mix 5 - Invention #3 | 100 | 90 | 0 | 0.0 | 1.5 | Moist[3] | 90 |
| Mix 6 - Invention #4 | 100 | 90 | 0 | 0.0 | 2.0 | Moist[3] | 90 |

[1]Sodium citrate 0.07 wt % of reactive powder blend Superplasticizer 0.50 wt % of reactive powder blend Sodium carbonate 0.20% of reactive powder blend Water/reactive powder weight ratio - 0.40 (includes aggregate moisture)
[2]Expanded shale aggregate
[3]Aggregate moisture content - 5%

The slurry temperature rise behavior for the mixture compositions investigated in this example are shown in FIG. 8 and their corresponding initial and final setting times are shown in Table 11. From FIG. 8 it can be clearly observed that despite the use of a very high amount of high alumina cement and gypsum in the mixture composition, the slurry temperature rise behavior is very inferior when moist aggregate are used (Mix 1). Also, the final setting time for this mixture is also very long compared to the similar mixture composition containing dry aggregate (i.e., Mix 1 of Example 8). When high alumina cement and gypsum are taken out from the mixture composition containing moist aggregate (Mix 2), the slurry temperature rise response degrades even further and the final setting time is increased tremendously. It is noteworthy that when triethanolamine is used in the mixture compositions containing moist aggregate and no high alumina cement and gypsum (Mixes 3 to 6), there is marked improvement in the slurry temperature rise behavior and the corresponding final setting times.

The slurry temperature rise behavior for the mixture compositions investigated in this example are shown in FIG. 9 and their corresponding initial and final setting times are reported in Table 12. From FIG. 9 it can be observed that the mixture compositions of the invention (Mixes 2 to 7) containing triethanolamine and no high alumina cement and gypsum yield slurry temperature rise behavior similar to that produced by the present state-of-the-art mixture composition containing high alumina cement and gypsum (Mix 1). It is particularly noteworthy that the mixture compositions of the invention (Mixes 3 to 7) as described above have final setting time that are significantly superior than the present state-of-the-art mixture composition (i.e., Mix 1). It can also be observed that the final setting time shortens significantly with increase in the dosage of triethanolamine.

TABLE 11

Initial and final setting times of mixture compositions of Example 8

| Mix Id. | Reactive Powder Blend (parts/100 parts of Portland Cement) | | | | TEA | Setting Times | |
|---|---|---|---|---|---|---|---|
| | Portland Cement (PC) | Fly Ash - Class C (FA) | High Alumina Cement (HAC) | Gypsum (G) | wt % of reactive powder blend | Initial Setting Time (min:sec) | Final Setting Time (min:sec) |
| Mix 1 - Conventional #1 | 100 | 90 | 17.5 | 5.9 | 0.0 | 7:30 | 20:30 |
| Mix 2 - Conventional #2 | 100 | 90 | 0 | 0.0 | 0.0 | — | >60:00 |
| Mix 3 - Invention #1 | 100 | 90 | 0 | 0.0 | 0.5 | 12:00 | 23:00 |
| Mix 4 - Invention #2 | 100 | 90 | 0 | 0.0 | 1.0 | 9:30 | 19:00 |
| Mix 5 - Invention #3 | 100 | 90 | 0 | 0.0 | 1.5 | 9:00 | 17:00 |
| Mix 6 - Invention #4 | 100 | 90 | 0 | 0.0 | 2.0 | 8:00 | 12:00 |

EXAMPLE 10

This example demonstrates effectiveness of the mixture compositions of the invention when the aggregate moisture content is as high as 10%. Table 12 shows the mixture compositions investigated in this example.

TABLE 12

Mixture compositions evaluated in Example 10[1]

| Mix Id. | Reactive Powder Blend (parts/100 parts of Portland Cement) | | | | TEA | Aggregate[2] | |
|---|---|---|---|---|---|---|---|
| | Portland Cement (PC) | Fly Ash - Class C (FA) | High Alumina Cement (HAC) | Gypsum (G) | wt % of reactive powder blend | Condition | wt % of reactive powder blend |
| Mix 1 - Conventional #1 | 100 | 90 | 18 | 6.0 | 0.0 | Moist[3] | 90 |
| Mix 2 - Invention #1 | 100 | 90 | 0 | 0.0 | 0.2 | Moist[3] | 90 |
| Mix 3 - Invention #2 | 100 | 90 | 0 | 0.0 | 0.4 | Moist[3] | 90 |
| Mix 4 - Invention #3 | 100 | 90 | 0 | 0.0 | 0.4 | Moist[3] | 90 |
| Mix 5 - Invention #4 | 100 | 90 | 0 | 0.0 | 1.0 | Moist[3] | 90 |
| Mix 6 - Invention #5 | 100 | 90 | 0 | 0.0 | 1.5 | Moist[3] | 90 |
| Mix 7 - Invention #6 | 100 | 90 | 0 | 0.0 | 2.0 | Moist[3] | 90 |

[1]Sodium citrate 0.04 wt % of reactive powder blend Superplasticizer 0.28 wt % of reactive powder blend Sodium carbonate 0.40% of reactive powder blend Water/reactive powder weight ratio - 0.40 (includes aggregate moisture)
[2]Expanded clay aggregate
[3]Aggregate moisture content - 10%

TABLE 13

Initial and final setting times of mixture compositions of Example 10

| | Reactive Powder Blend (parts/100 parts of Portland Cement) | | | | TEA | Setting Times | |
|---|---|---|---|---|---|---|---|
| Mix Id. | Portland Cement (PC) | Fly Ash - Class C (FA) | High Alumina Cement (HAC) | Gypsum (G) | wt % of reactive powder blend | Initial Setting Time (min:sec) | Final Setting Time (min:sec) |
| Mix 1 - Conventional #1 | 100 | 90 | 18 | 6.0 | 0.0 | 7:30 | 18:40 |
| Mix 2 - Invention #1 | 100 | 90 | 0 | 0.0 | 0.2 | 7:56 | 19:04 |
| Mix 3 - Invention #2 | 100 | 90 | 0 | 0.0 | 0.4 | 7:25 | 15:15 |
| Mix 4 - Invention #3 | 100 | 90 | 0 | 0.0 | 0.8 | 7:25 | 12:30 |
| Mix 5 - Invention #4 | 100 | 90 | 0 | 0.0 | 1.0 | 6:00 | 11:00 |
| Mix 6 - Invention #5 | 100 | 90 | 0 | 0.0 | 1.5 | 7:38 | 12:04 |
| Mix 7 - Invention #6 | 100 | 90 | 0 | 00 | 2.0 | 7:13 | 12:20 |

EXAMPLE 11

This example demonstrates effectiveness of the mixture compositions of the invention containing Class F Fly Ash. Table 14 shows the mixture compositions investigated in this example.

TABLE 14

Mixture compositions evaluated in Example 11[1]

| | Reactive Powder Blend (parts/100 parts of Portland Cement) | | | | TEA | Aggregate[2] | |
|---|---|---|---|---|---|---|---|
| Mix Id. | Portland Cement (PC) | Fly Ash - Class F (FA) | High Alumina Cement (HAC) | Gypsum (G) | wt % of reactive powder blend | Condition | wt % of reactive powder blend |
| Mix 1 - Invention #1 | 100 | 0 | 0 | 0.0 | 1.0 | Dry | 90 |
| Mix 2 - Invention #2 | 100 | 30 | 0 | 0.0 | 1.0 | Dry | 90 |
| Mix 3 - Invention #3 | 100 | 60 | 0 | 0.0 | 1.0 | Dry | 90 |
| Mix 4 - Invention #4 | 100 | 90 | 0 | 0.0 | 1.0 | Dry | 90 |

[1]Sodium citrate 0.07 wt % of reactive powder blend Superplasticizer 0.25 wt % of reactive powder blend Sodium carbonate 0.40% of reactive powder Water/reactive powder weight ratio - 0.42
[2]Expanded shale aggregate The slurry temperature rise behavior for the mixture compositions investigated in this example are shown in FIG. 10 and their corresponding initial and final setting times are reported in Table 14. These results clearly demonstrate that significant improved slurry temperature rise behavior and setting time result even when Class F fly ash is used as pozzolan in the mixture compositions of the invention. Form these results it can also be noticed that both the slurry temperature rise behavior and setting times improve substantially with decrease in the fly ash dosage in the composition.

TABLE 15

Initial and final setting times of mixture compositions of Example 11

| | Reactive Powder Blend (parts/100 parts of Portland Cement) | | | | TEA | Setting Times | |
|---|---|---|---|---|---|---|---|
| Mix Id. | Portland Cement (PC) | Fly Ash - Class F (FA) | High Alumina Cement (HAC) | Gypsum (G) | wt % of reactive powder blend | Initial Setting Time (min:sec) | Final Setting Time (min:sec) |
| Mix 1 - Invention #1 | 100 | 0 | 0 | 0.0 | 1.0 | 3:00 | 5:00 |
| Mix 2 - Invention #2 | 100 | 30 | 0 | 0.0 | 1.0 | 4:10 | 9:30 |

TABLE 15-continued

Initial and final setting times of mixture compositions of Example 11

| | Reactive Powder Blend (parts/100 parts of Portland Cement) | | | | TEA | Setting Times | |
|---|---|---|---|---|---|---|---|
| Mix Id. | Portland Cement (PC) | Fly Ash - Class F (FA) | High Alumina Cement (HAC) | Gypsum (G) | wt % of reactive powder blend | Initial Setting Time (min:sec) | Final Setting Time (min:sec) |
| Mix 3 - Invention #3 | 100 | 60 | 0 | 0.0 | 1.0 | 7:15 | 12:30 |
| Mix 4 - Invention #2 | 100 | 90 | 0 | 0.0 | 1.0 | 7:40 | 21:00 |

EXAMPLE 12

This example demonstrates effectiveness of the mixture compositions of the invention containing ground granulated blast furnace slag as a pozzolan rather than fly ash. Table 16 shows the mixture compositions investigated in this example.

TABLE 16

Mixture compositions evaluated in Example 12[1]

| | Reactive Powder Blend (parts/100 parts of Portland Cement) | | | | TEA | Aggregate[2] | |
|---|---|---|---|---|---|---|---|
| Mix Id. | Portland Cement (PC) | Slag[3] (GGBFS) | High Alumina Cement (HAC) | Gypsum (G) | wt % of reactive powder blend | Condition | wt % of reactive powder blend |
| Mix 1 - Invention #1 | 100 | 0 | 0 | 0.0 | 1.0 | Dry | 90 |
| Mix 2 - Invention #2 | 100 | 30 | 0 | 0.0 | 1.0 | Dry | 90 |
| Mix 3 - Invention #3 | 100 | 60 | 0 | 0.0 | 1.0 | Dry | 90 |
| Mix 4 - Invention #4 | 100 | 90 | 0 | 0.0 | 1.0 | Dry | 90 |

[1]Sodium citrate 0.07 wt % of reactive powder blend Superplasticizer 0.25 wt % of reactive powder blend Sodium carbonate 0.40% of reactive powder Water/reactive powder weight ratio - 0.42
[2]Expanded shale aggregate
[3]GGBFS — Ground granulated blast furnace slag The slurry temperature rise behavior for the mixture compositions investigated in this example are shown in FIG. 11 and their corresponding initial and final setting times are reported in Table 17. These results clearly demonstrate that significant improved slurry temperature rise behavior and setting time result even when ground granulated blast furnace slag is used as pozzolan in the mixture compositions of the invention. It can also be noticed from the results that both the slurry temperature rise behavior and setting times improve substantially with decrease in the dosage of ground granulated blast furnace slag in the composition.

TABLE 17

Initial and final setting times of mixture compositions of Example 11

| | Reactive Powder Blend (parts/100 parts of Portland Cement) | | | | TEA | Setting Times | |
|---|---|---|---|---|---|---|---|
| Mix Id. | Portland Cement (PC) | Slag (GGBFS) | High Alumina Cement (HAC) | Gypsum (G) | wt % of reactive powder blend | Initial Setting Time (min:sec) | Final Time (min:sec) |
| Mix 1 - Invention #1 | 100 | 0 | 0 | 0.0 | 1.0 | 3:30 | 5:30 |
| Mix 2 - Invention #2 | 100 | 30 | 0 | 0.0 | 1.0 | 5:00 | 13:00 |
| Mix 3 - Invention #3 | 100 | 60 | 0 | 0.0 | 1.0 | 6:20 | 15:30 |
| Mix 4 - Invention #4 | 100 | 90 | 0 | 0.0 | 1.0 | 10:00 | 20:00 |

EXAMPLES 13

Example 13 shows the influence of type of mineral additive on the slurry temperature rise behavior and setting characteristics of the compositions of the invention. Three different types of mineral additives possessing pozzolanic properties were investigated—Class C Fly Ash, Class F Fly Ash and Ground Granulated Blast Furnace Slag (GGBFS). Mixtures of portland cement, a pozzolanic material and TEA were prepared to illustrate the relative influence of these pozzolanic materials on the rapid setting characteristics of the compositions of invention. The mixture compositions investigated in this example are shown in Table 18.

TABLE 18

Final setting times for mixtures of Example 13

| Mix Id. | Mineral Additive | Reactive Powder Blend (parts/100 parts of Portland Cement) | | | | | Final Setting Times (min:sec) | Aggregate | |
| --- | --- | --- | --- | --- | --- | --- | --- | --- | --- |
| | | Portland Cement | Mineral Additive | High Alumina Cement (HAC) | Gypsum (G) | TEA wt % | | Condition | wt % of reactive powder blend |
| Mix 1 | Class C Fly Ash | 100 | 90 | 0 | 0 | 0.4 | 5.5 | Dry | 90 |
| Mix 2 | Class F Fly Ash | 100 | 90 | 0 | 0 | 0.4 | 8.5 | Dry | 90 |
| Mix 3 | GGBFS | 100 | 90 | 0 | 0 | 0.4 | 10.0 | Dry | 90 |

[1]Sodium carbonate 0.2 wt % of reactive powder blend sodium citrate 0.04 wt % of reactive powder blend Superplasticizer 0.4 wt % of reactive powder blend water/reactive powder weight ratio - 0.40
[2]Expanded shale aggregate FIG. 12 shows that Class C fly ash provides superior performance, compared to Class F fly ash or ground granulated blast furnace slag. The rate of temperatures rise was more rapid for Class C fly ash mixture compared to Class F fly ash mixture, and the maximum temperature achieved was greater than those for blast furnace slag or Class F fly ash mixtures. This rapid temperature rise and maximum temperature resulted in the shortest final set time for the Class C fly ash mixture. This is believed to be due to the higher lime and tricalcium aluminate content of Class C fly ash.

EXAMPLE 14

This example demonstrates the influence of initial slurry temperature on the setting characteristics of the cementitious compositions of the invention containing dry aggregate with Type III Portland cement comprising 100% of the reactive powder. Table 19 shows the mixture compositions investigated in this example.

TABLE 19

Mixture compositions evaluated in Example 14[1]

| Mix Id. | Initial Slurry Temp. (° F.) | Reactive Powder Blend (parts/100 parts of Portland Cement) | | | | TEA wt % of reactive powder blend | Aggregate[2] | |
| --- | --- | --- | --- | --- | --- | --- | --- | --- |
| | | Portland Cement (PC) | Fly Ash (FA) | High Alumina Cement (HAC) | Gypsum (G) | | Condition[3] | wt % of reactive powder blend |
| Mix 1 - Conventional #1 | 75 | 100 | 0 | 0 | 0 | 1.0 | Dry | 90 |
| Mix 2 - Invention #1 | 115 | 100 | 0 | 0 | 0 | 1.0 | Dry | 90 |

[1]Sodium citrate 0.04 wt % of reactive powder blend Superplasticizer 0.10 wt % of reactive powder blend Sodium carbonate 0.20% of reactive powder blend Water/reactive powder weight ratio - 0.40
[2]Expanded shale aggregate Table 20 shows the final setting times of the mixture compositions investigated in this example. It can be observed that when the initial slurry temperature is 75° F., the final setting time is extremely long of the order of 97 minutes. On the other hand, when the initial slurry temperature is 115° F., the final setting time is attained very fast in 5.5 minutes.

TABLE 20

Final setting times of mixture compositions of Example 14

| Mix Id. | Initial Slurry Temp. (° F.) | Reactive Powder Blend (parts/100 parts of Portland Cement) | | | | TEA wt % of reactive powder blend | Final Setting Time (min:sec) |
| --- | --- | --- | --- | --- | --- | --- | --- |
| | | Portland Cement (PC) | Fly Ash (FA) | High Alumina Cement (HAC) | Gypsum (G) | | |
| Mix 1 - Conventional #1 | 75 | 100 | 0 | 0 | 0 | 1.0 | 97:00 |
| Mix 2 - Invention #1 | 115 | 100 | 0 | 0 | 0 | 1.0 | 5:30 |

EXAMPLE 15

This example demonstrates the influence of initial slurry temperature and triethanolamine content on the setting characteristics of the cementitious compositions of the invention. Table 21 shows the mixture compositions investigated in this example.

TABLE 21

Mixture compositions evaluated in Example 15[1]

| Mix Id. | Initial Slurry Temp. (° F.) | Reactive Powder Blend (parts/100 parts of Portland Cement) | | | | TEA wt % of reactive powder blend | Aggregate[2] | |
| --- | --- | --- | --- | --- | --- | --- | --- | --- |
| | | Portland Cement (PC) | Mineral Additive (3) | High Alumina Cement (HAC) | Gypsum (G) | | Condition[3] | wt % of reactive powder blend |
| Mix 1 - Invention #1 | 95 | 100 | 90 | 0 | 0 | 0.5 | Dry | 90 |
| Mix 2 - Invention #2 | 95 | 100 | 90 | 0 | 0 | 1.0 | Dry | 90 |
| Mix 3 - Invention #3 | 95 | 100 | 90 | 0 | 0 | 2.0 | Dry | 90 |
| Mix 4 - Invention #4 | 105 | 100 | 90 | 0 | 0 | 0.5 | Dry | 90 |
| Mix 5 - Invention #5 | 105 | 100 | 90 | 0 | 0 | 1.0 | Dry | 90 |
| Mix 6 - Invention #6 | 105 | 100 | 90 | 0 | 0 | 2.0 | Dry | 90 |
| Mix 7 - Invention #7 | 117 | 100 | 90 | 0 | 0 | 0.10 | Dry | 90 |
| Mix 8 - Invention #8 | 117 | 100 | 90 | 0 | 0 | 0.30 | Dry | 90 |
| Mix 9 - Invention #9 | 117 | 100 | 90 | 0 | 0 | 0.40 | Dry | 90 |
| Mix 10 - Invention #10 | 117 | 100 | 90 | 0 | 0 | 0.50 | Dry | 90 |
| Mix 11 - Invention #11 | 127 | 100 | 90 | 0 | 0 | 0.05 | Dry | 90 |
| Mix 12 - Invention #12 | 127 | 100 | 90 | 0 | 0 | 0.50 | Dry | 90 |
| Mix 13 - Invention #13 | 127 | 100 | 90 | 0 | 0 | 1.0 | Dry | 90 |

[1]Sodium citrate 0.04 wt %, superplasticizer 0.40 wt % and sodium carbonate 0.20% of reactive powder blend, Water/reactive powder weight ratio - 0.40.
[2]Expanded shale aggregate
[3]Class C Fly Ash except for Mix 2 GGBFS and Mix 3 Class F Fly Ash Table 22 shows the final setting times of the mixture compositions investigated in this example. It can be observed that when the initial slurry temperature is 96° F. mixtures required a TEA dosage of 2.0% to achieve a final set of 12.5 minutes. On the other hand, when the initial slurry temperature is 117° F., the final setting time is attained very fast in about 5.5 minutes with a TEA dosage of only 0.4%. It should be noticed that mixes with slurry temperature of 127° F. attained slightly longer final setting times when compared to mixes made at a slurry temperatures of 117° F.

TABLE 22

Final setting times of mixture compositions of Example 15

| Mix Id. | Initial Slurry Temp. (° F.) | Reactive Powder Blend (parts/100 parts of Portland Cement) | | | | TEA | Final Setting Time (min:sec) |
| --- | --- | --- | --- | --- | --- | --- | --- |
| | | Portland Cement (PC) | Fly Ash (FA) | High Alumina Cement (HAC) | Gypsum (G) | wt % of reactive powder blend | |
| Mix 2 - Invention #1 | 96 | 100 | 90 | 0 | 0 | 0.50 | 55:00 |
| Mix 3 - Invention #2 | 96 | 100 | 90 | 0 | 0 | 1.0 | 25:00 |
| Mix 4 - Invention #3 | 96 | 100 | 90 | 0 | 0 | 2.0 | 12:30 |
| Mix 5 - Invention #4 | 105 | 100 | 90 | 0 | 0 | 0.50 | 36:42 |
| Mix 6 - Invention #5 | 105 | 100 | 90 | 0 | 0 | 1.0 | 20:00 |
| Mix 7 - Invention #6 | 105 | 100 | 90 | 0 | 0 | 2.0 | 10:24 |
| Mix 8 - Invention #7 | 117 | 100 | 90 | 0 | 0 | 0.10 | 13:00 |
| Mix 9 - Invention #8 | 117 | 100 | 90 | 0 | 0 | 0.30 | 8:30 |
| Mix 10 - Invention #9 | 117 | 100 | 90 | 0 | 0 | 0.40 | 5:45 |
| Mix 11 - Invention #10 | 117 | 100 | 90 | 0 | 0 | 0.50 | 3:50 |
| Mix 12 - Invention #11 | 127 | 100 | 90 | 0 | 0 | 0.05 | 17:00 |
| Mix 13 - Invention #12 | 127 | 100 | 90 | 0 | 0 | 0.50 | 7:00 |
| Mix 14 - Invention #13 | 127 | 100 | 90 | 0 | 0 | 1.0 | 5:30 |

EXAMPLE 16

This example demonstrates the influence of initial slurry temperature on the setting characteristics of the cementitious compositions of the invention containing moist aggregate. Table 23 shows the mixture compositions investigated in this example.

TABLE 23

Mixture compositions evaluated in Example 16[1]

| Mix Id. | Initial Slurry Temp. (° F.) | Reactive Powder Blend (parts/100 parts of Portland Cement) | | | | TEA | Aggregate[2] | |
| --- | --- | --- | --- | --- | --- | --- | --- | --- |
| | | Portland Cement (PC) | Fly Ash (FA) | High Alumina Cement (HAC) | Gypsum (G) | wt % of reactive powder blend | Condition[3] | wt % of reactive powder blend |
| Mix 1 - Conventional #1 | 75 | 100 | 0 | 0 | 0 | 1.0 | Moist | 90 |
| Mix 2 - Invention #1 | 115 | 100 | 0 | 0 | 0 | 1.0 | Moist | 90 |

[1]Sodium citrate 0.04 wt % of reactive powder blend Superplasticizer 0.10 wt % of reactive powder blend Sodium carbonate 0.20% of reactive powder blend Water/reactive powder weight ratio - 0.40
[2]Expanded shale aggregate
[3]Aggregate moisture content - 5%

Table 24 shows the final setting times of the mixture compositions investigated in this example. It can be observed that when the initial slurry temperature is 75° F., the final setting time is extremely long being greater than 180 minutes. On the other hand, when the initial slurry temperature is 115° F., the final setting time is attained very quickly in less than 8 minutes.

TABLE 24

Final setting times of mixture compositions of Example 16

| Mix Id. | Initial Slurry Temp. (° F.) | Reactive Powder Blend (parts/100 parts of Portland Cement) | | | | TEA | Final Setting Time (min:sec) |
| --- | --- | --- | --- | --- | --- | --- | --- |
| | | Portland Cement (PC) | Fly Ash (FA) | High Alumina Cement (HAC) | Gypsum (G) | wt % of reactive powder blend | |
| Mix 1 - Conventional #1 | 75 | 100 | 0 | 0 | 0 | 1.0 | >180:00 |
| Mix 2 - Invention #1 | 115 | 100 | 0 | 0 | 0 | 1.0 | 7:55 |

EXAMPLE 17

This example demonstrates the influence of initial slurry temperature and sodium citrate dosage on the slurry temperature rise characteristics of the cementitious compositions of the invention. Table 25 shows the mixture compositions investigated in this example.

EXAMPLE 18

This example demonstrates the mechanical performance of cement-based composites made using the cementitious compositions of the invention. Table 26 shows the modulus of rupture (MOR) for cement boards composed of the cementitious composition of the invention and surface rein-

TABLE 25

Mixture compositions evaluated in Example 17[1]

| Mix Id. | Initial Slurry Temp. (° F.) | Reactive Powder Blend (parts/100 parts of Portland Cement) | | | | Sodium Citrate wt % of reactive powder blend | Aggregate[2] | |
|---|---|---|---|---|---|---|---|---|
| | | Portland Cement (PC) | Fly Ash (FA) | High Alumina Cement (HAC) | Gypsum (G) | | Condition[3] | wt % of reactive powder blend |
| Mix 1 - Invention #1 | 105 | 100 | 90 | 0 | 0 | 0.00 | Dry | 90 |
| Mix 2 - Invention #2 | 105 | 100 | 90 | 0 | 0 | 0.04 | Dry | 90 |
| Mix 3 - Invention #3 | 105 | 100 | 90 | 0 | 0 | 0.08 | Dry | 90 |
| Mix 4 - Invention #4 | 127 | 100 | 90 | 0 | 0 | 0.00 | Dry | 90 |
| Mix 5 - Invention #5 | 127 | 100 | 90 | 0 | 0 | 0.04 | Dry | 90 |
| Mix 6 - Invention #6 | 127 | 100 | 90 | 0 | 0 | 0.08 | Dry | 90 |

[1]TEA 0.50 wt %, superplasticizer 0.40 wt % and sodium carbonate 0.20% of reactive powder blend, Water/reactive powder weight ratio - 0.40.
[2]Expanded shale aggregate FIG. 13 shows the temperature development of the mixture compositions investigated in this example. The following observations can be made:

At initial slurry temperature of 105° F., sodium citrate dosage of 0% produces best results. Accordingly, at slurry temperatures lower than 105° F., presence of forced with fiberglass mesh. Each set of data includes the MOR for board specimens in the cross machine direction (XMD) and machine direction (MD). Table 26 indicates that the panels made with compositions of the invention meet the MOR required by the American National Standard for Test Methods and Specifications for Cementitious Backer Units ANSI A-118.9, American National Standard Institute, NY, N.Y. The values indicated are similar for compositions in Mix 1 and Mix 2 and are within standard error for these tests.

TABLE 26

Mechanical performance for mixtures in Example 18[1]

| Mix Id. | Reactive Powder Blend (parts/100 parts of Portland Cement) | | | | TEA wt % of reactive powder blend | MOR psi | |
|---|---|---|---|---|---|---|---|
| | Portland Cement (PC) | Fly Ash - Class C (FA) | High Alumina Cement (HAC) | Gypsum (G) | | XMD | MD |
| Mix 1 - Invention #1 | 100 | 95 | 9 | 3.3 | 0.09 | 1081 | 812 |
| Mix 2 - Invention #2 | 100 | 95 | 0 | 0.0 | 0.4 | 993 | 983 |

[1]Superplasticizer 0.2 wt %, sodium citrate 0.09 wt % and sodium carbonate 0.4% of reactive powder blend, Water/reactive powder weight ratio - 0.40
[2]Expanded shale aggregate ratio - 0.86 sodium citrate in the mixture compositions of invention is not essential.

On the other hand, at a relatively high initial slurry temperature of 127° F., the presence of sodium citrate in the compositions of invention produces best results. Notice that the sodium citrate dosage of at least 0.04% is necessary to achieve the desired slurry temperature rise behavior.

From the above results, it becomes obvious that the use of sodium citrate in the mixture compositions of the invention is desirable at relatively high initial slurry temperatures (greater than 105° F.).

What is claimed is:

1. A method of providing a fast setting slurry comprising mixing an accelerating amount of an alkanolamine with hydraulic cement and water under conditions which provide an initial slurry temperature of at least 90° F. or 32.2° C. said slurry rapidly reaching peak temperature and achieving rapid setting compared to slurries having a lower initial temperature.

2. A method of claim 1 wherein said slurry has an initial temperature of at least 95° F. or 35° C.

3. A method of claim 1 wherein said slurry has an initial temperature of at least 100° F. or 37.8° C.

4. A method of claim 1 wherein said slurry has an initial temperature of at least 105° F. or 40.6° C.

5. A method of claim 1 wherein said slurry has an initial temperature of at least 110° F. or 43.3° C.

6. A method of claim 1 wherein said slurry has an initial temperature of about 110°–120° F. or 43.3–48.9° C.

7. A method of claim 1 wherein said slurry has an initial temperature of at least 125° F. or 51.6° C.

8. A method of claim 1 wherein said slurry has an initial temperature of about 130° F. or 54.4° C.

9. A method of claim 1 wherein said slurry has an initial temperature of 90 to 130° F. or 32.2°–54.4° C.

10. A method of claim 1 wherein said alkanolamine is selected from the group consisting of triethanolamine, diethanolamine, monoethanolamine and mixtures thereof.

11. A method of claim 1 wherein said alkanolamine is triethanol amine and said accelerating amount of triethanolamine is about 0.03 to 4.0 wt % based on the weight of hydraulic cement.

12. A method of claim 1 wherein said hydraulic cement is portland cement.

13. A method of claim 12 wherein said slurry further comprises a mineral additive.

14. A method of claim 13 wherein said mineral additive is fly ash.

15. A method of claim 14 wherein said fly ash is Class C fly ash.

16. A method of claim 13 wherein said mineral additive is ground granulated blast furnace slag.

17. A method of claim 13 wherein said slurry further comprises high alumina cement and calcium sulfate.

18. A method of claim 13 wherein said slurry further comprises an aggregate.

19. A method of claim 17 wherein said slurry further comprises an aggregate.

20. A method of claim 1 wherein said slurry further comprises a set retarder.

21. A method of claim 20 wherein said set retarder is sodium citrate.

22. A method of claim 17 wherein said portland cement is about 40 to 80 wt %, said high alumina cement is greater than zero up to 20 wt %, said alcium sulfate is greater than zero up to 7 wt %, said fly ash is greater than zero up to 55 wt %, based on the sum of said portland cement, high alumina cement, calcium sulfate and fly ash.

23. A method of claim 14 wherein said portland cement is about 40 to 80 wt % and said fly ash is 20 to 60 wt % based on the sum of said portland cement and fly ash.

24. A method of claim 22 wherein said alkanolamine is triethanolamine and in an amount of about 0.05 to 2.0 wt % based on the sum of said portland cement, high alumina cement, calcium sulfate, and fly ash.

25. A method of claim 23 wherein said alkanolamine is triethanolamine and in an amount of about 0.05 to 1.0 wt % based on the sum of portland cement and fly ash.

26. A method of claim 1 wherein said, initial slurry temperature is achieved by heating one or more of the components of said slurry.

27. A method of claim 1 wherein said slurry further comprises an inorganic set accelerator.

28. A method of claim 27 wherein said set accelerator is sodium carbonate.

29. A method of claim 1 wherein said slurry further comprises a superplasticizer.

30. A composition for preparing a cement board comprising:
  (a) portland cement;
  (b) mineral additive;
  (c) aggregate;
  (d) as an accelerator for components (a) and (b) an alkanolamine;
  (e) sufficient water to prepare a slurry; said slurry being at a temperature of at least 90° F. or 32.2° C. when components (a)–(e) are mixed to form said composition, said slurry rapidly reaching peak temperature and achieving rapid setting compared to slurries having a lower initial temperature.

31. A composition of claim 30 wherein said alkanolamine is selected from the group consisting of triethanolamine, diethanolamine, monoethanolamine and mixtures thereof.

32. A composition of claim 31 wherein said alkanolamine is triethanolamine and said accelerating amount of triethanolamine is about 0.03 to 4.0 wt % based on the weight of portland cement.

33. A composition of claim 30 wherein said mineral additive is fly ash.

34. A composition of claim 30 wherein said mineral additive is ground granulated blast furnace slag.

35. A composition of claim 33 wherein said composition further comprises high alumina cement and calcium sulfate.

36. A composition of claim 30 wherein said composition further comprises a set retarder.

37. A composition of claim 36 wherein set retarder is sodium citrate.

38. A composition of claim 35 wherein said portland cement is about 40 to 80 wt %, said high alumina cement is greater than zero up to 20 wt %, aid calcium sulfate is greater than zero up to 7 wt %, said fly ash is greater than zero up to 55 wt %, based on the sum of said portland cement, high alumina cement, calcium sulfate and fly ash.

39. A composition of claim 33 wherein said portland cement is about 40 to 80 wt % and said fly ash is 20 to 60 wt % based on the sum of said portland cement and fly ash.

40. A composition of claim 30 wherein said composition includes an inorganic set accelerator.

41. A composition of claim 40 wherein said inorganic set accelerator is sodium carbonate.

42. A composition of claim 30 wherein said composition further comprises a superplasticizer.

* * * * *

UNITED STATES PATENT AND TRADEMARK OFFICE
CERTIFICATE OF CORRECTION

PATENT NO. : 6,869,474 B2
DATED : March 22, 2005
INVENTOR(S) : Perez-Pena et al.

It is certified that error appears in the above-identified patent and that said Letters Patent is hereby corrected as shown below:

Title page,
Item [74], *Attorney, Agent, or Firm*, please insert -- Michael M. Geoffrey --.

Signed and Sealed this

Fifth Day of July, 2005

JON W. DUDAS
*Director of the United States Patent and Trademark Office*